(12) United States Patent
Northrup

(10) Patent No.: US 10,852,694 B2
(45) Date of Patent: Dec. 1, 2020

(54) NB CONTROLLER AND FORM FACTORS

(71) Applicant: Charles Northrup, Bedford, NH (US)

(72) Inventor: Charles Northrup, Bedford, NH (US)

( * ) Notice: Subject to any disclaimer, the term of this patent is extended or adjusted under 35 U.S.C. 154(b) by 0 days.

(21) Appl. No.: 16/287,897

(22) Filed: Feb. 27, 2019

(65) Prior Publication Data

US 2019/0265645 A1    Aug. 29, 2019

Related U.S. Application Data

(60) Provisional application No. 62/636,252, filed on Feb. 28, 2018.

(51) Int. Cl.
| | | |
|---|---|---|
| *G03H 1/00* | (2006.01) | |
| *H04N 5/225* | (2006.01) | |
| *G03H 1/02* | (2006.01) | |
| *G03H 1/22* | (2006.01) | |

(52) U.S. Cl.
CPC ......... *G03H 1/0011* (2013.01); *G03H 1/0248* (2013.01); *G03H 1/2202* (2013.01); *G03H 1/2205* (2013.01); *H04N 5/2252* (2013.01); *G03H 2001/2234* (2013.01); *G03H 2001/2244* (2013.01); *G03H 2222/34* (2013.01); *G03H 2223/24* (2013.01)

(58) Field of Classification Search
CPC .. G03H 1/0011; G03H 1/2205; G03H 1/2202; G03H 1/0248; G03H 2001/2234; G03H 2222/34; G03H 2001/2244; G03H 2223/24; H04N 5/2252

USPC .......................................................... 348/40
See application file for complete search history.

(56) References Cited

U.S. PATENT DOCUMENTS

| | | |
|---|---|---|
| 7,142,336 B2 | 11/2006 | Kawano et al. |
| 7,753,266 B2 | 7/2010 | Harris |
| 2009/0272805 A1 | 11/2009 | Riddle et al. |

FOREIGN PATENT DOCUMENTS

KR    20030088100    11/2003

OTHER PUBLICATIONS

International Search Report and Written Opinion for PCT/US19/19889, dated May 10, 2019.

*Primary Examiner* — Jared Walker
(74) *Attorney, Agent, or Firm* — Sheehan Phinney Bass & Green PA

(57) ABSTRACT

A system includes a plurality of optical identifiers and a reader for the optical identifiers. Each optical identifier has an optical substrate and a volume hologram (e.g., with unique data, such as a code page) in the optical substrate. The reader for the optical identifiers includes a laser, and a camera. The laser is configured to direct laser light into a selected one of the optical identifiers that has been placed into the reader to produce an image of the associated volume holograms at the camera. The camera is configured to capture the image. The captured image may be stored in a digital format by the system.

9 Claims, 23 Drawing Sheets

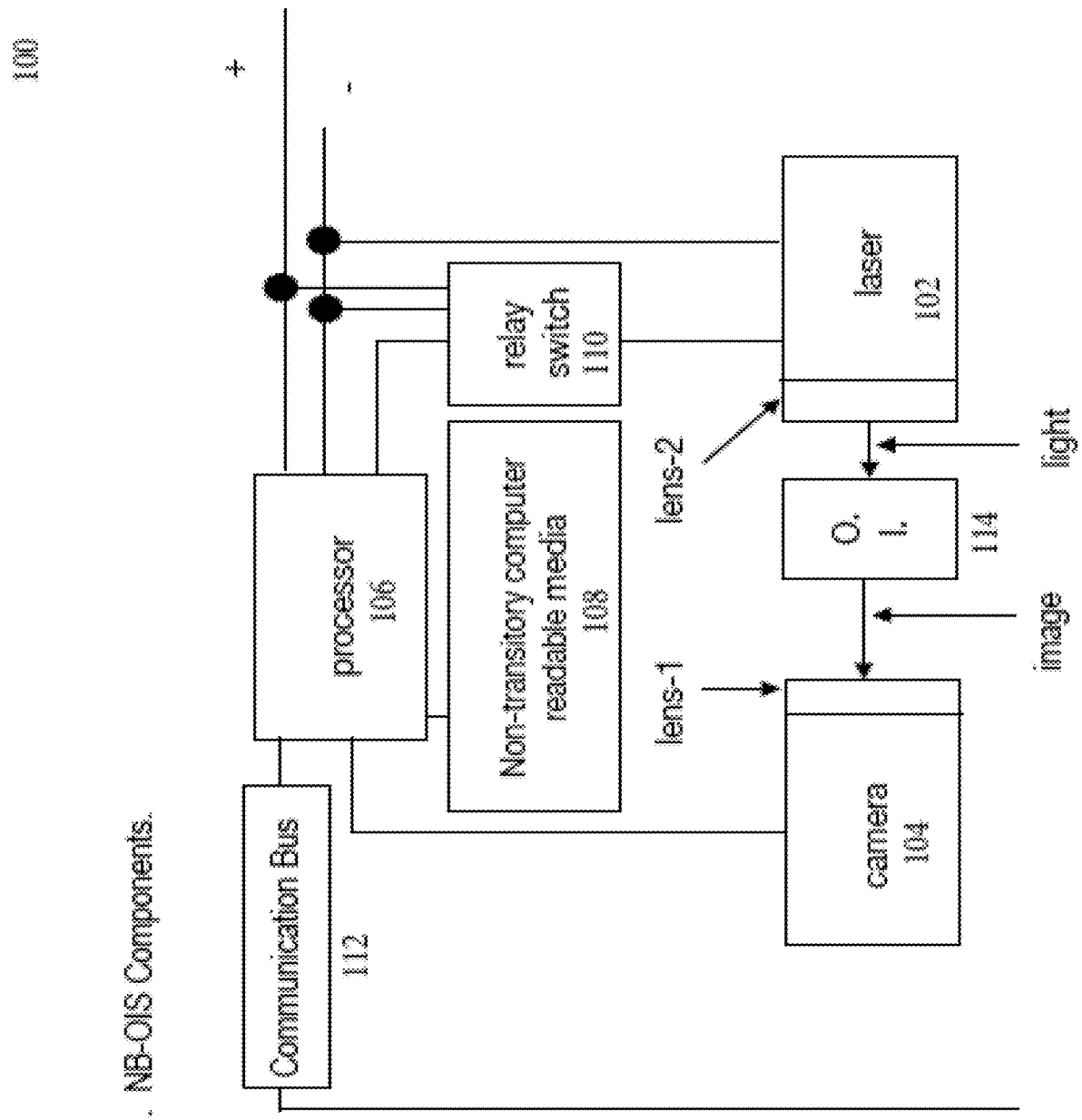
Figure 1. NB-OIS Components.

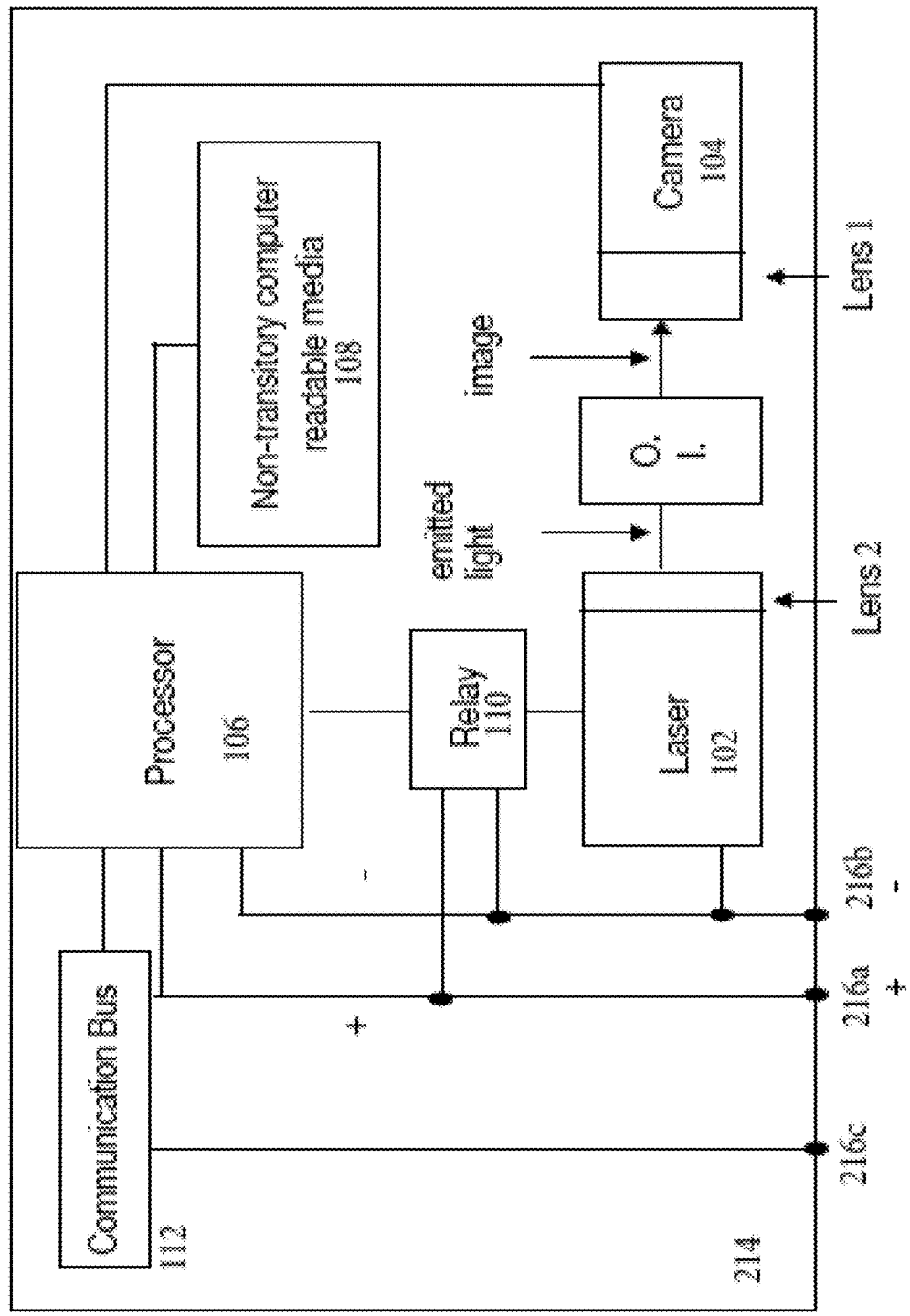
Figure 2. NB-OIS with Solder Points.

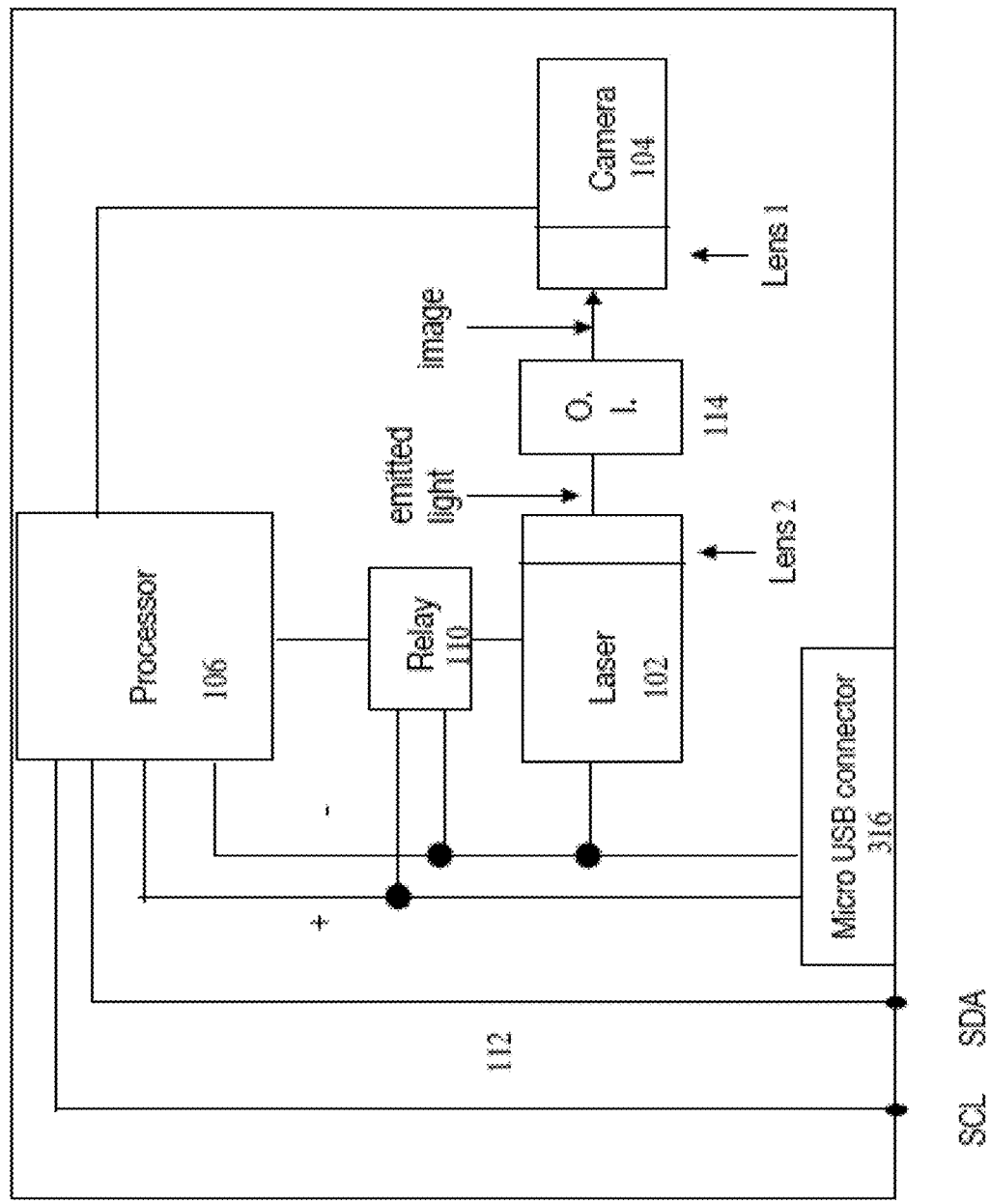
Figure 3. NB-OIS Micro with Micro USB Power.

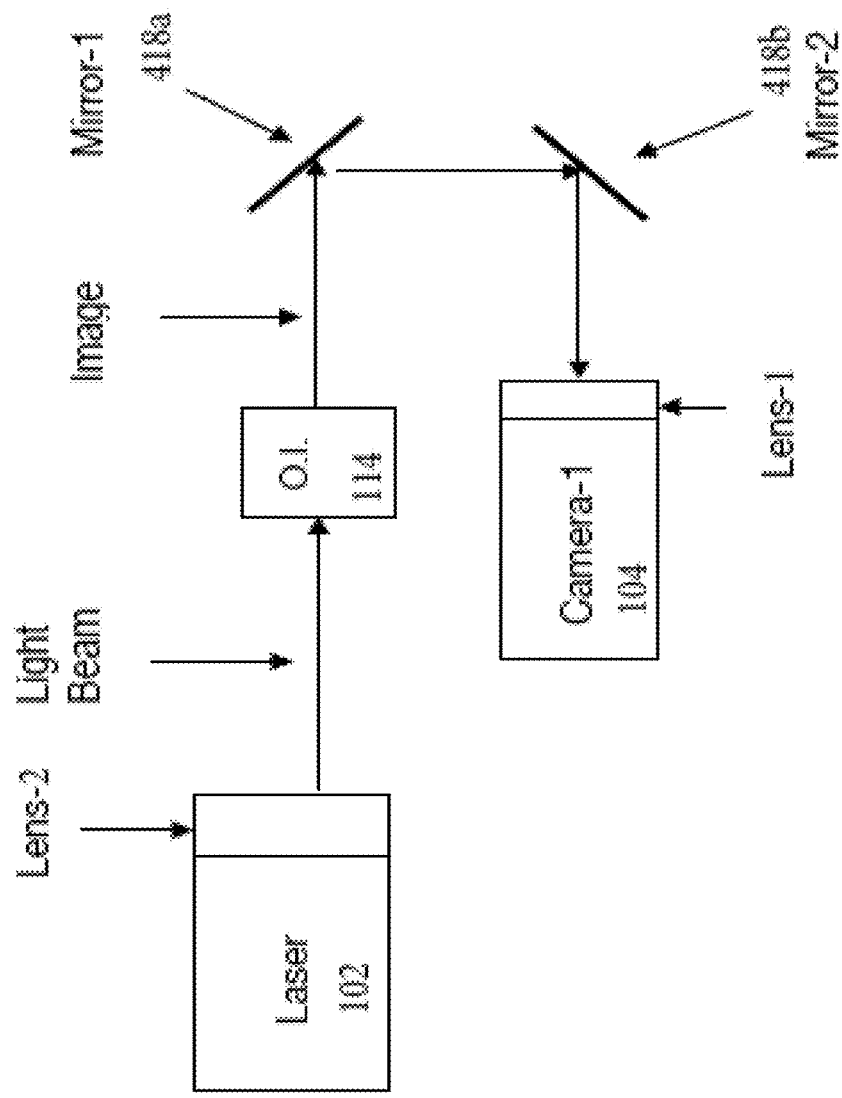
Figure 4. Using Mirrors.

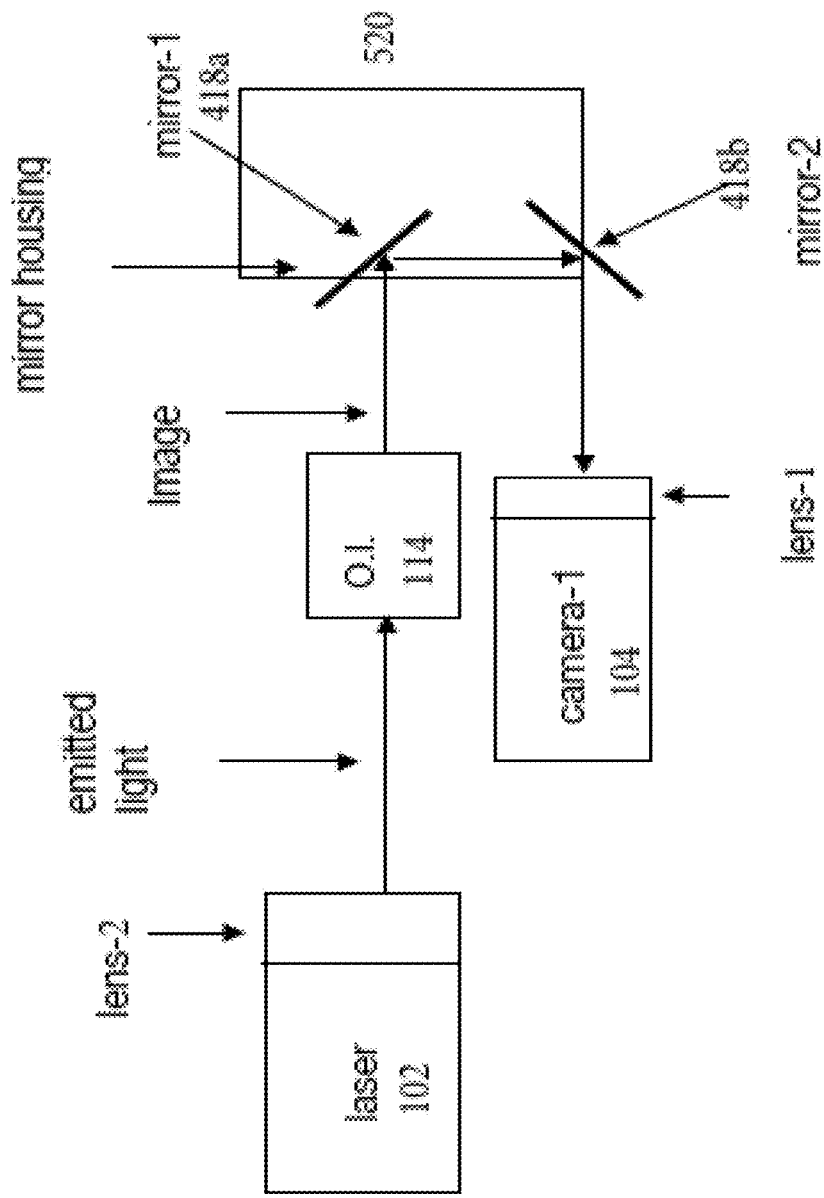

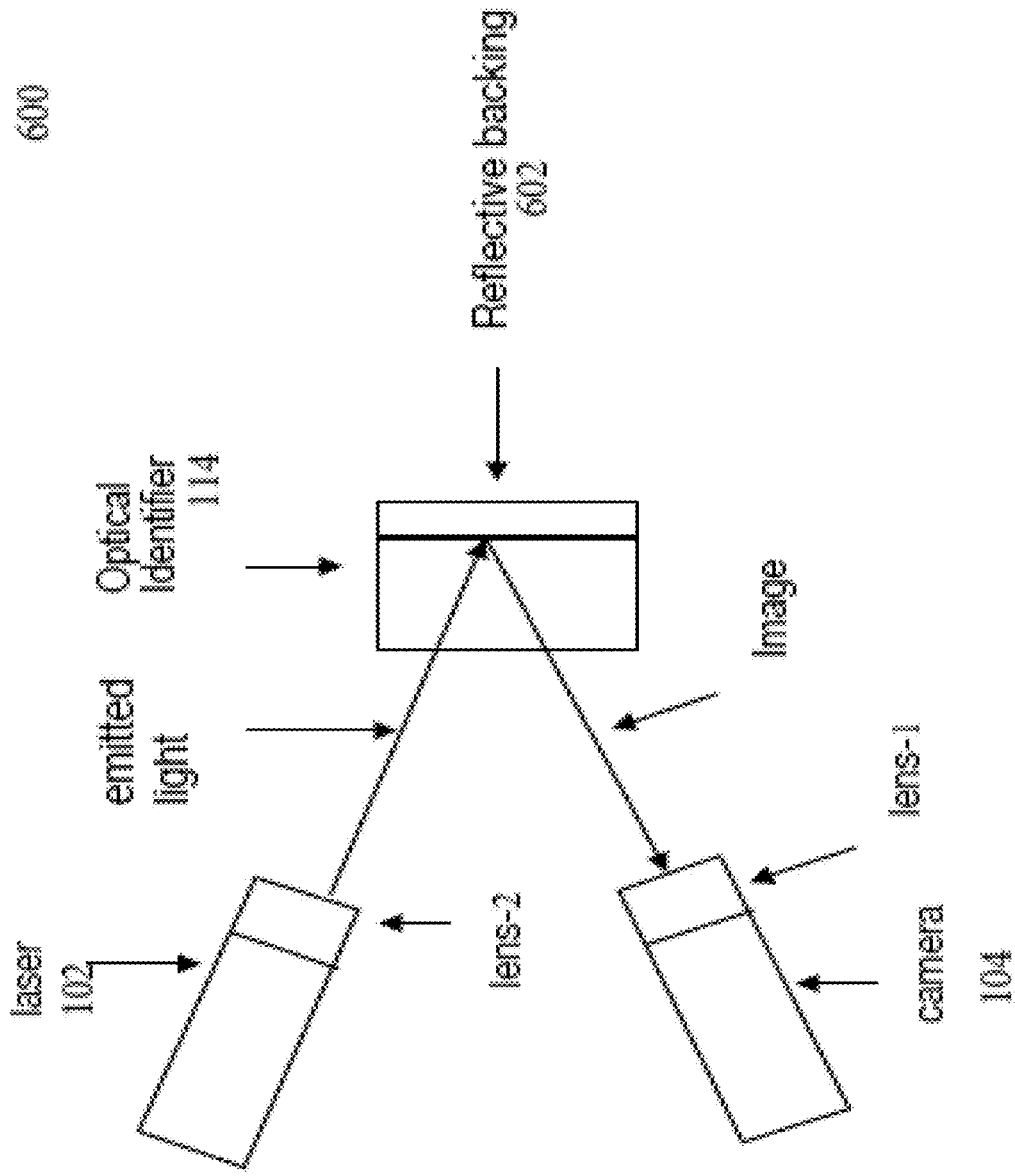

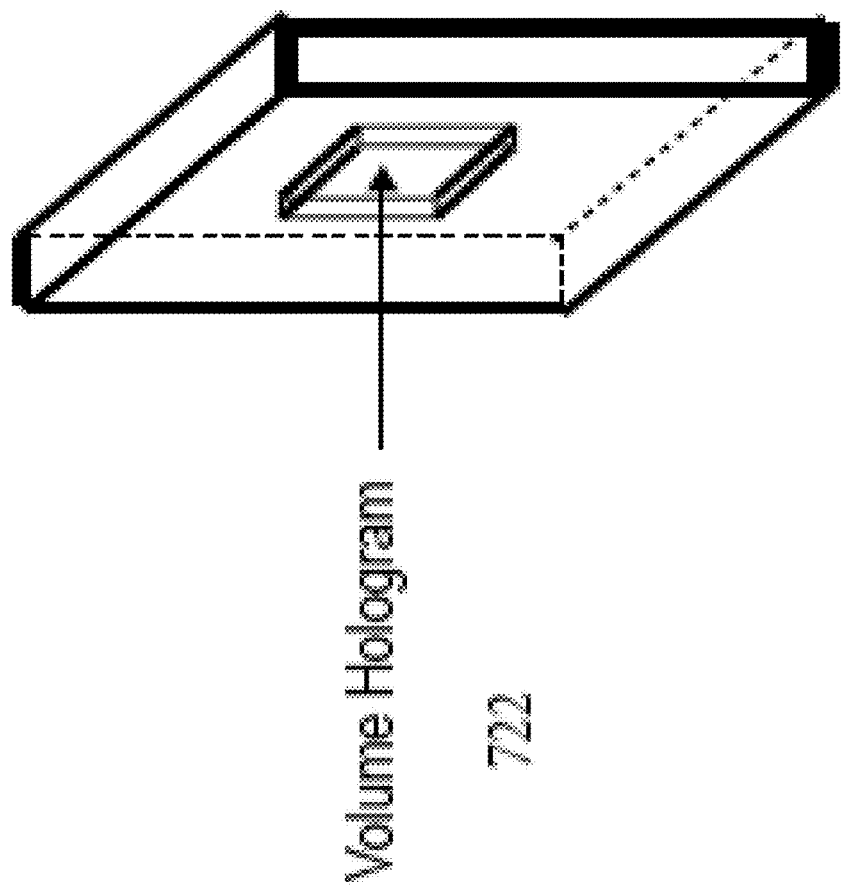
Figure 7. O.I. Unit.
Volume Hologram
722

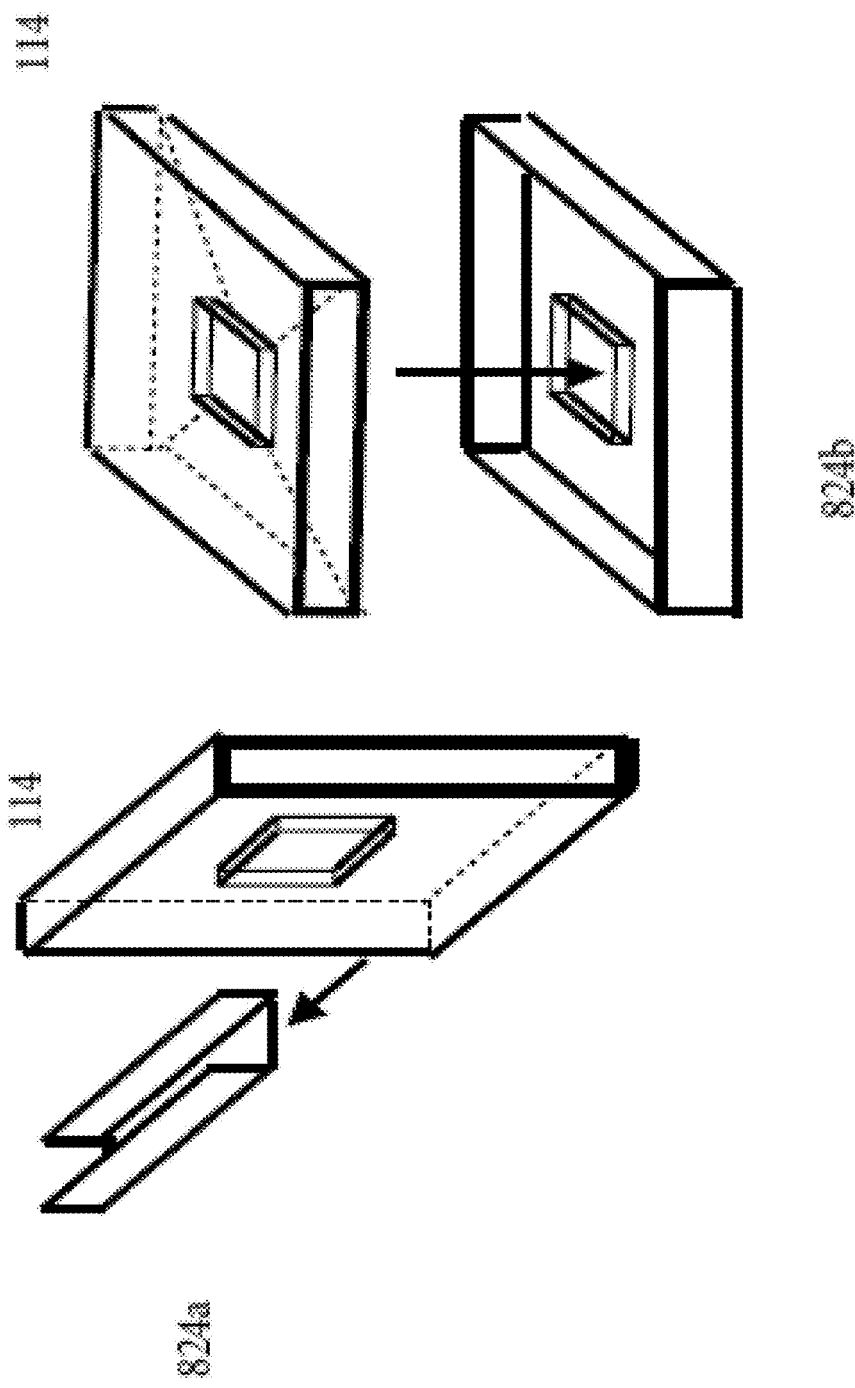

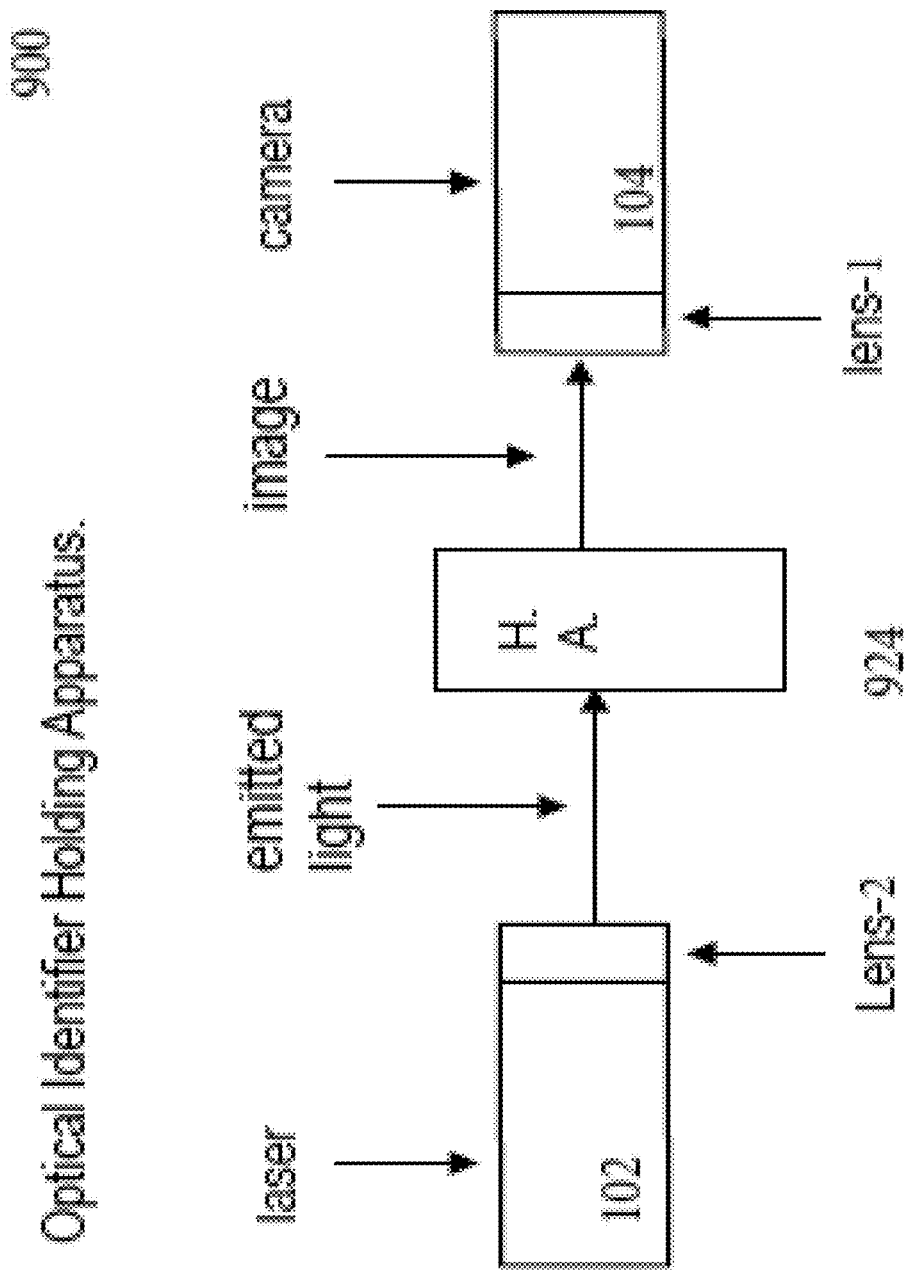

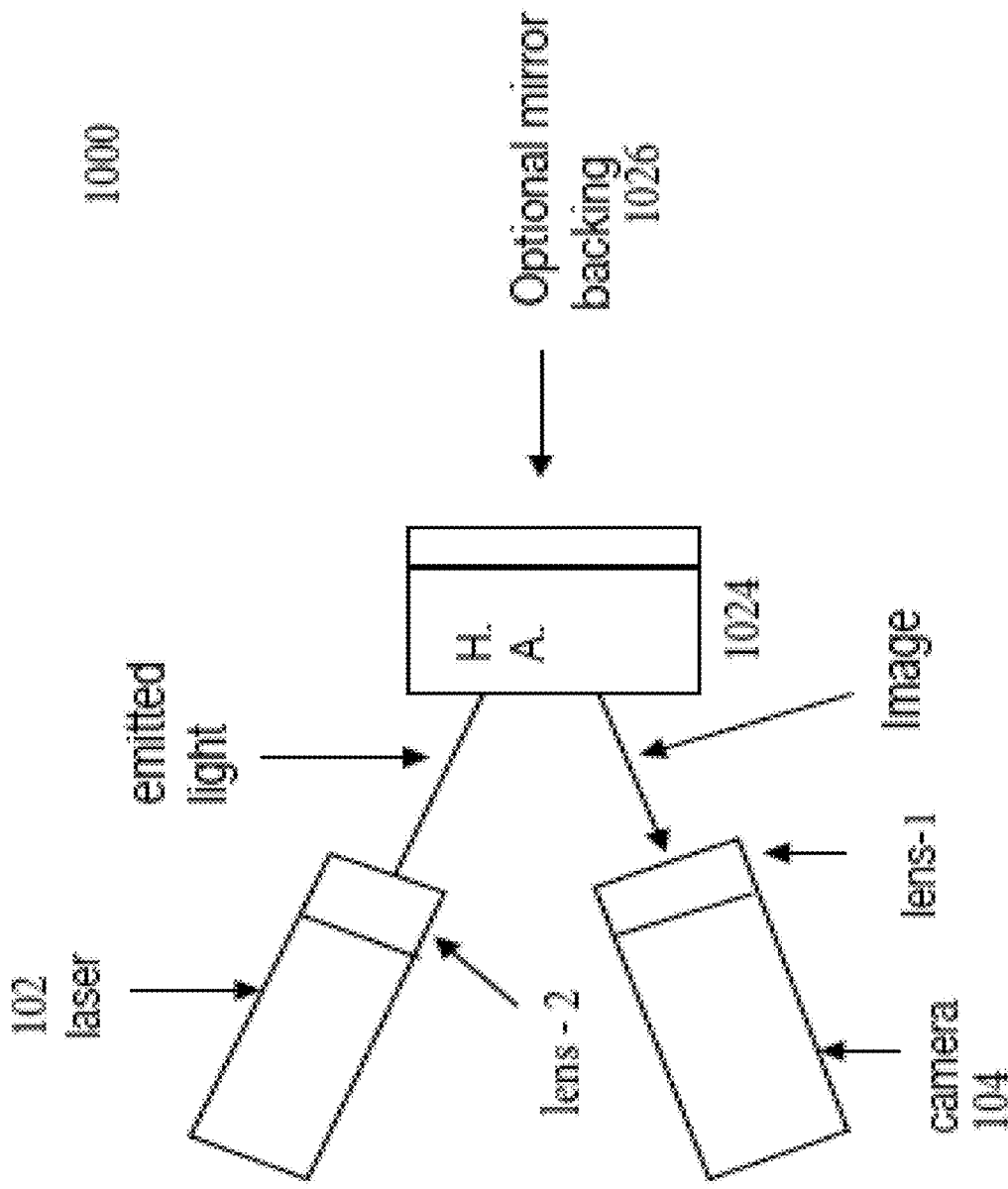
Figure 10. Optical Identifier Reflective Hologram Holding Apparatus.

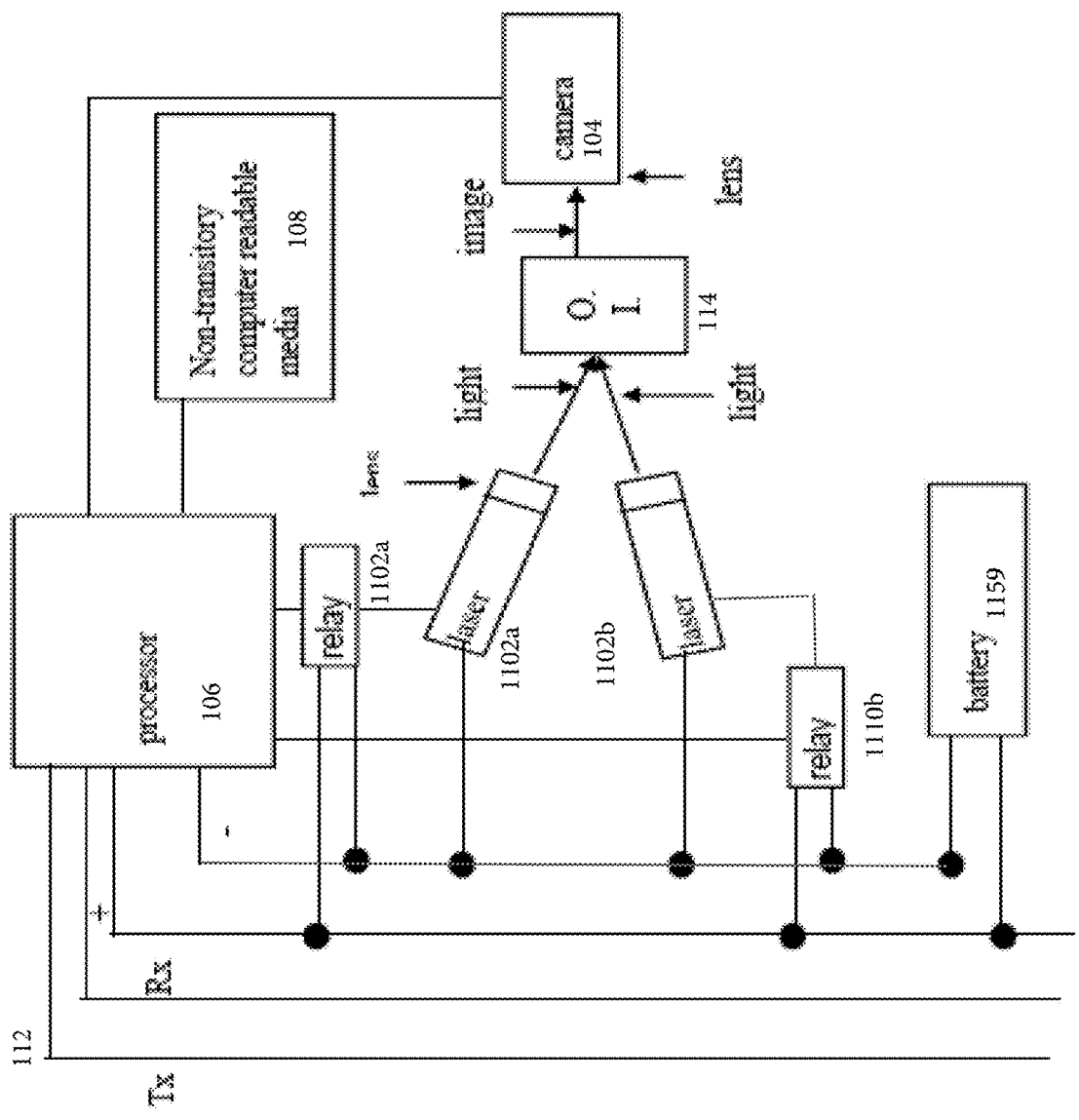
Figure 11  Dual Reference Beams

Figure 12. NB-OIS circuit board.
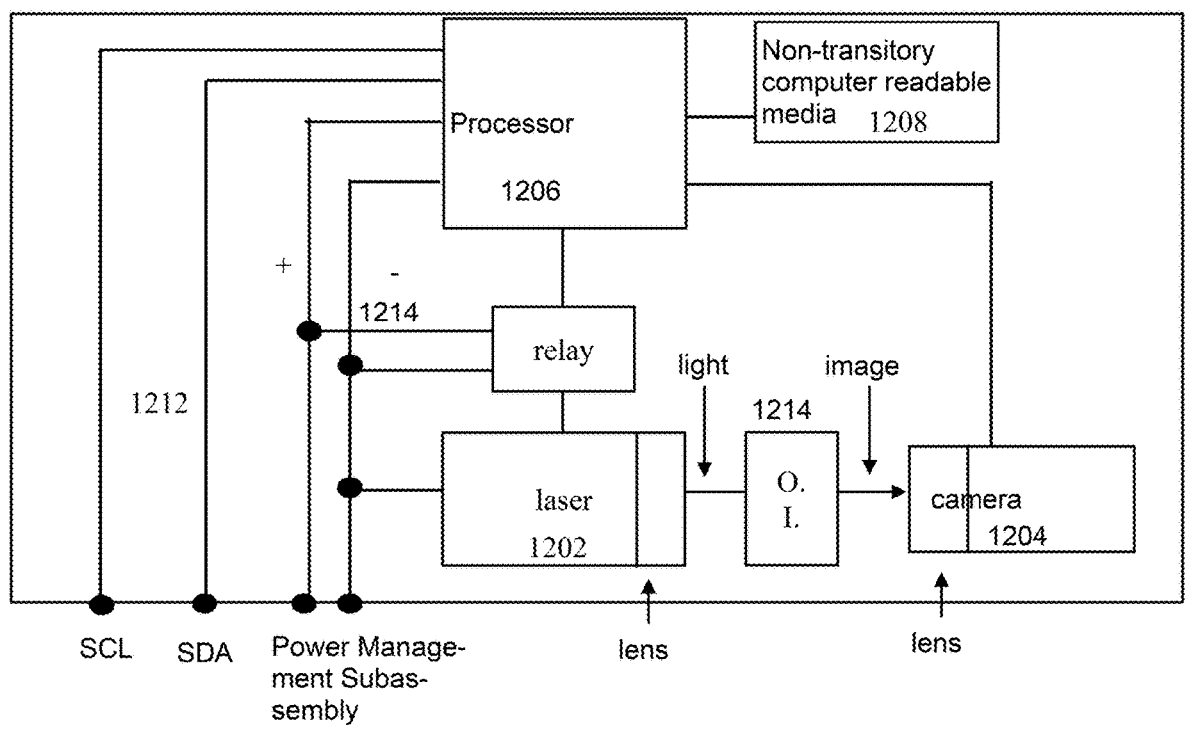

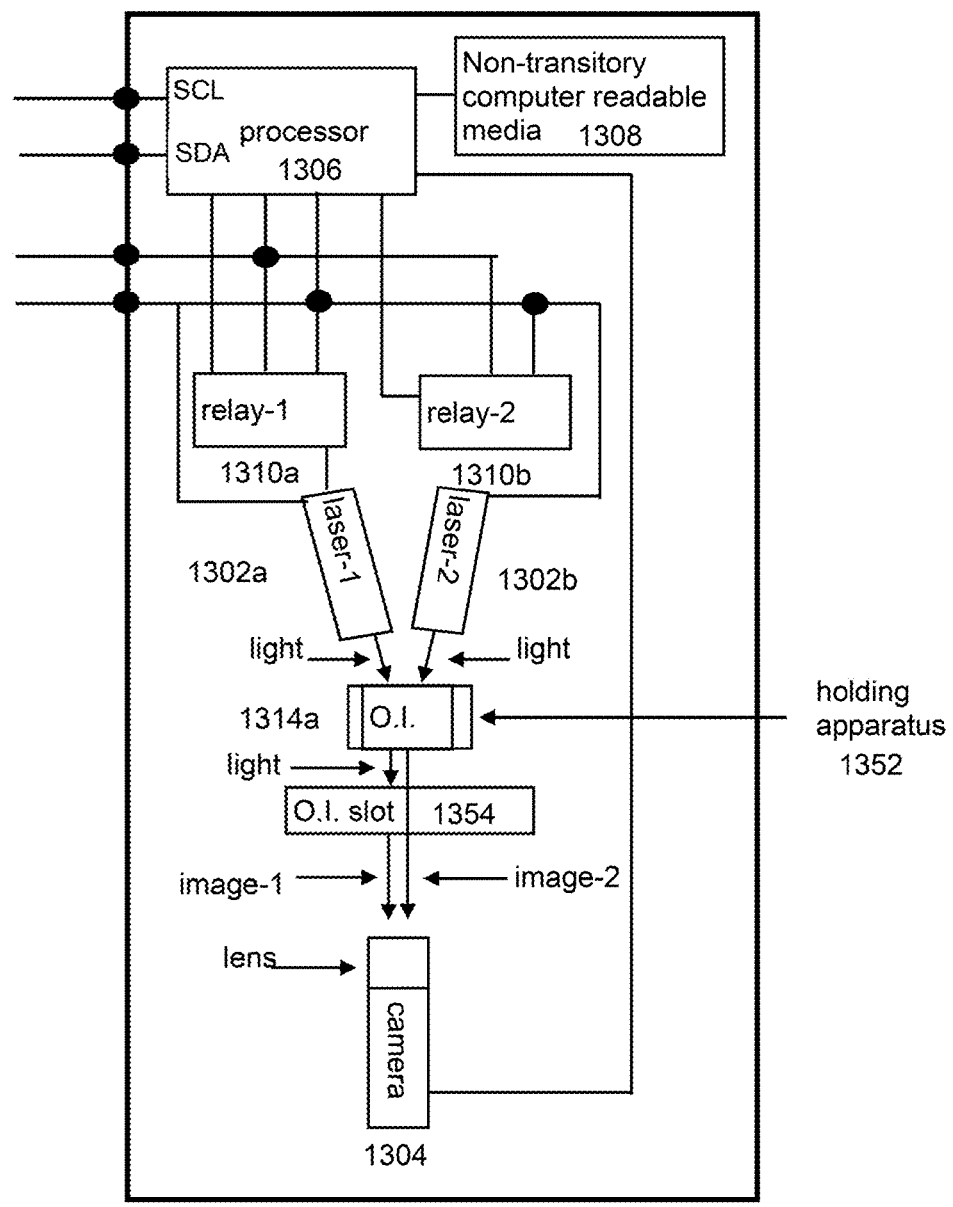
Figure 13. NB-OIS with a laser array.

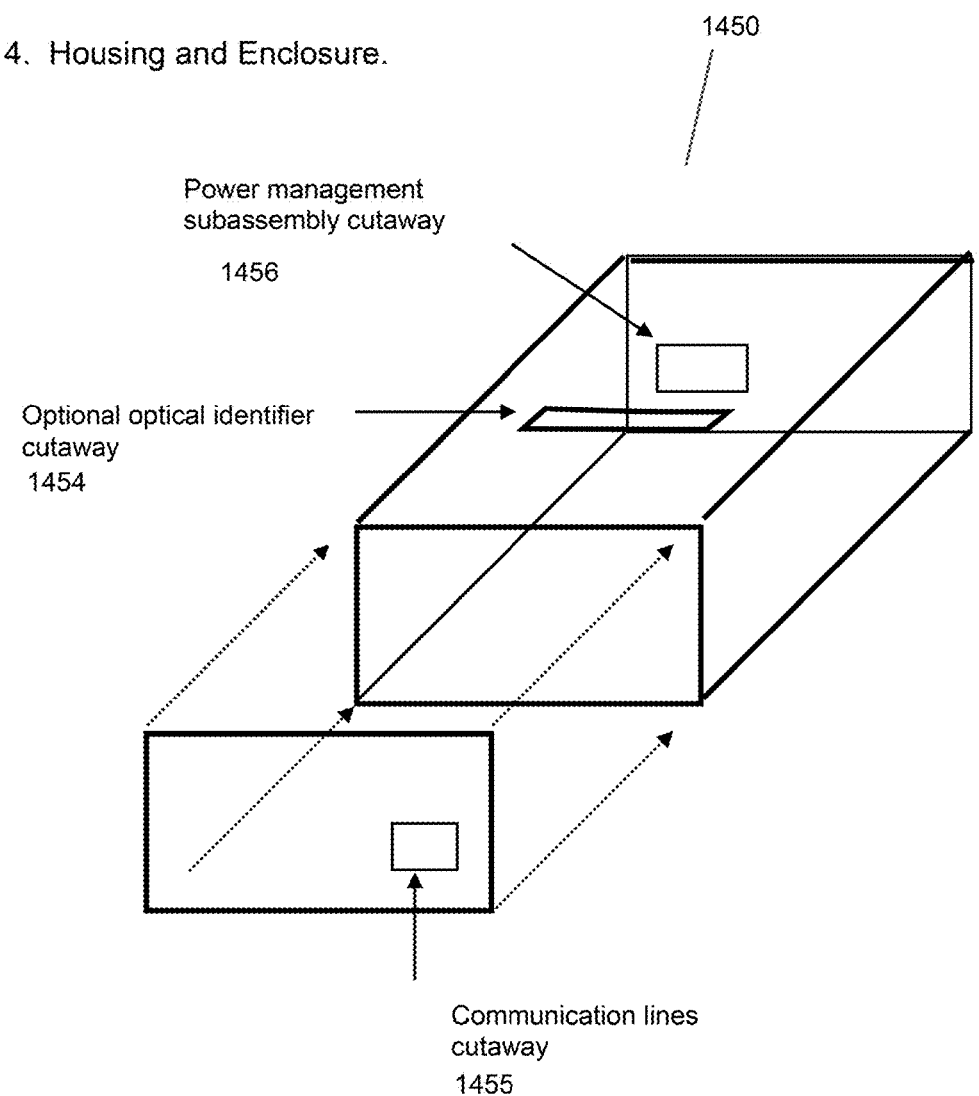
Figure 14. Housing and Enclosure.

Figure 15. NB-Controller Single Communication Bus.
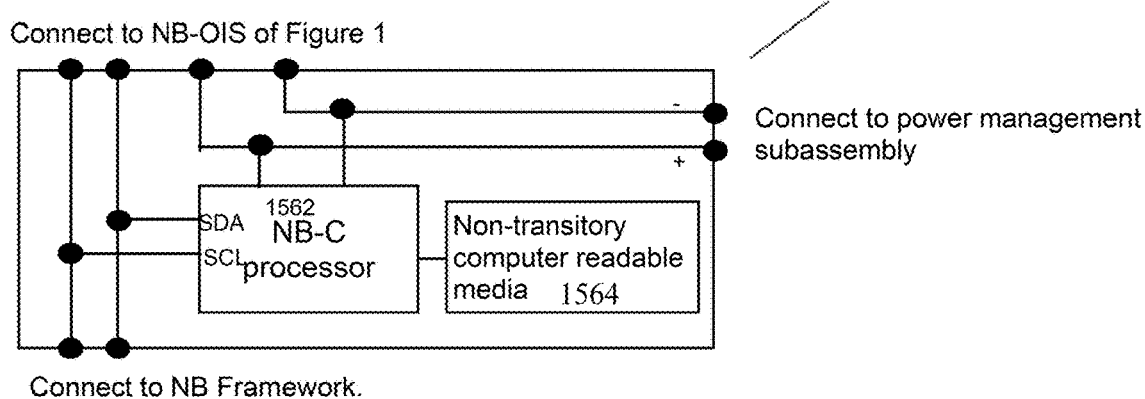
Figure 16 NB-Controller Dual Communication Bus.
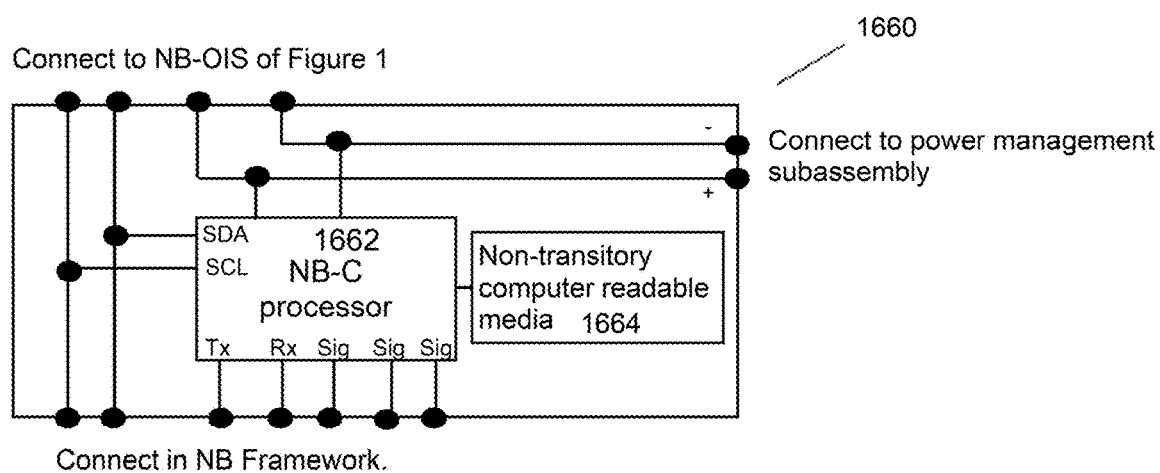

Figure 17. Mobile personal NB with User Affirmation Device.
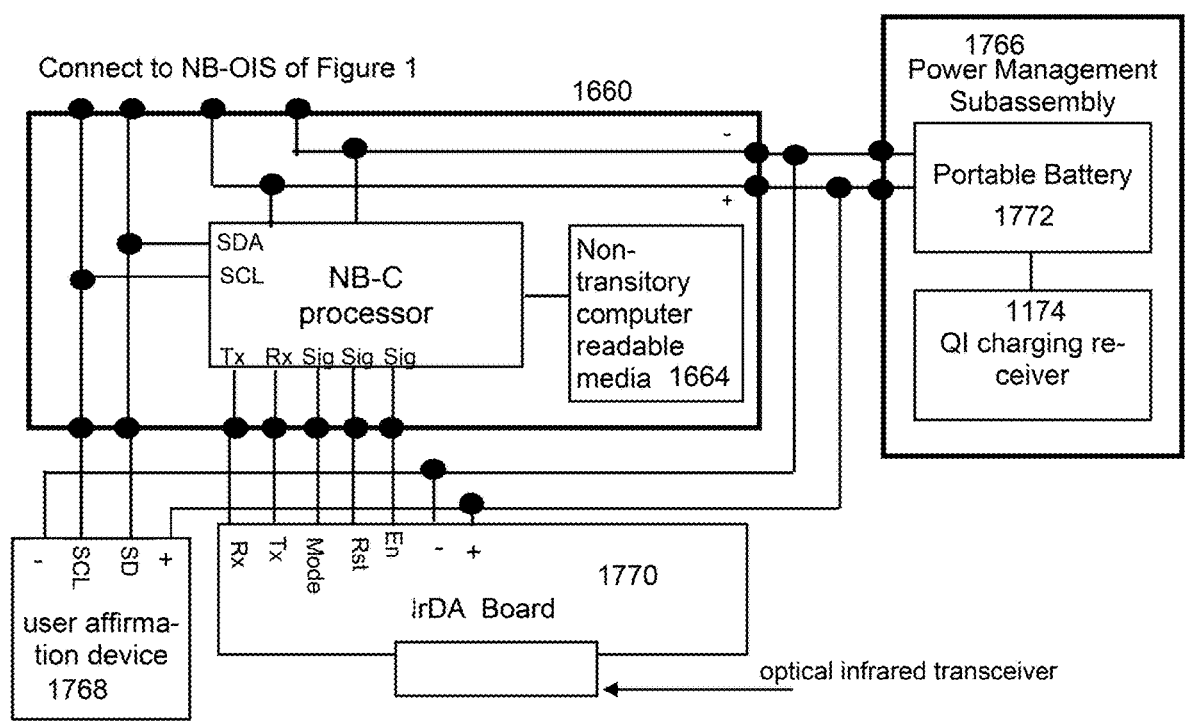

Figure 18. Mobile personal NB with Push Button.
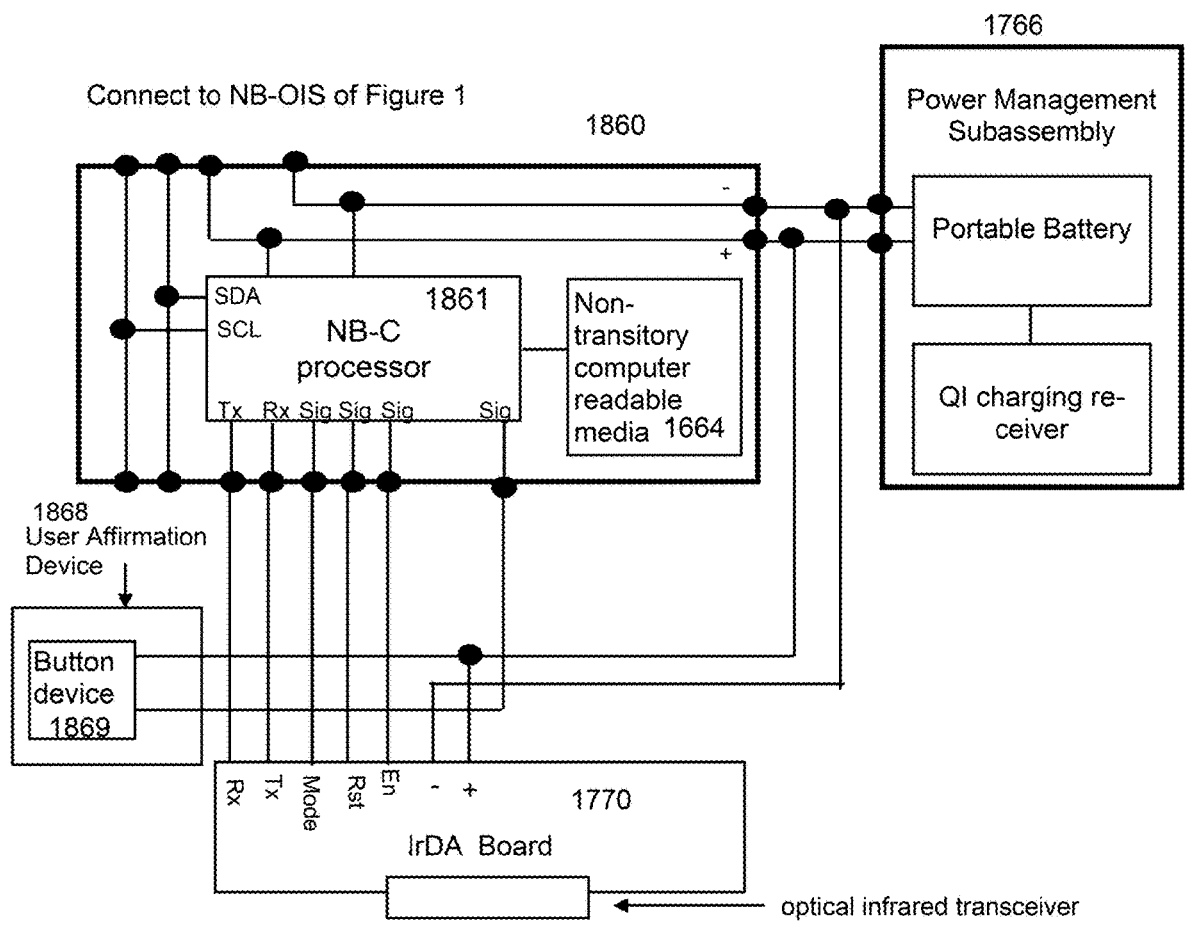

Figure 19. A Home NeurBot Form Factor.
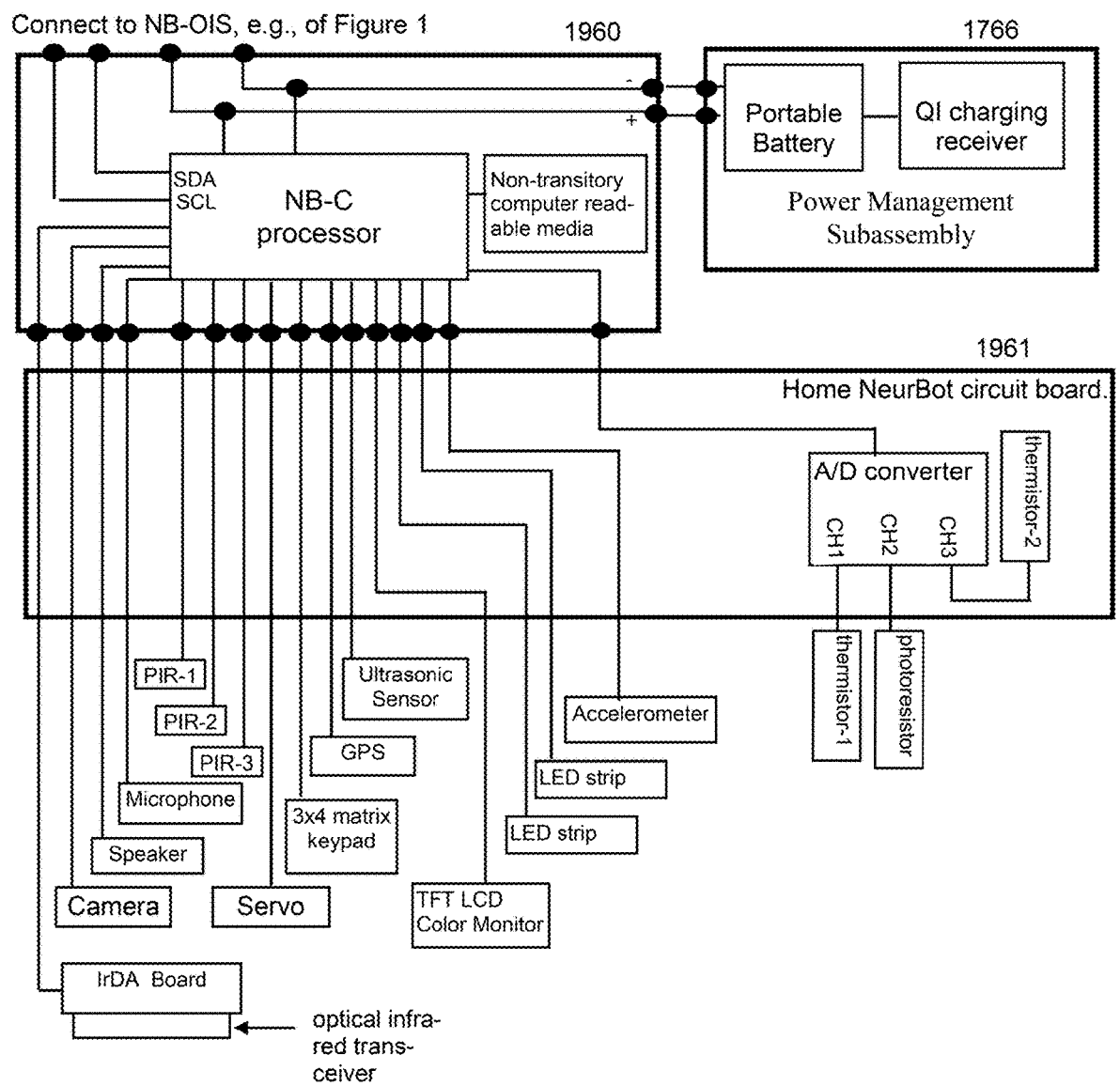

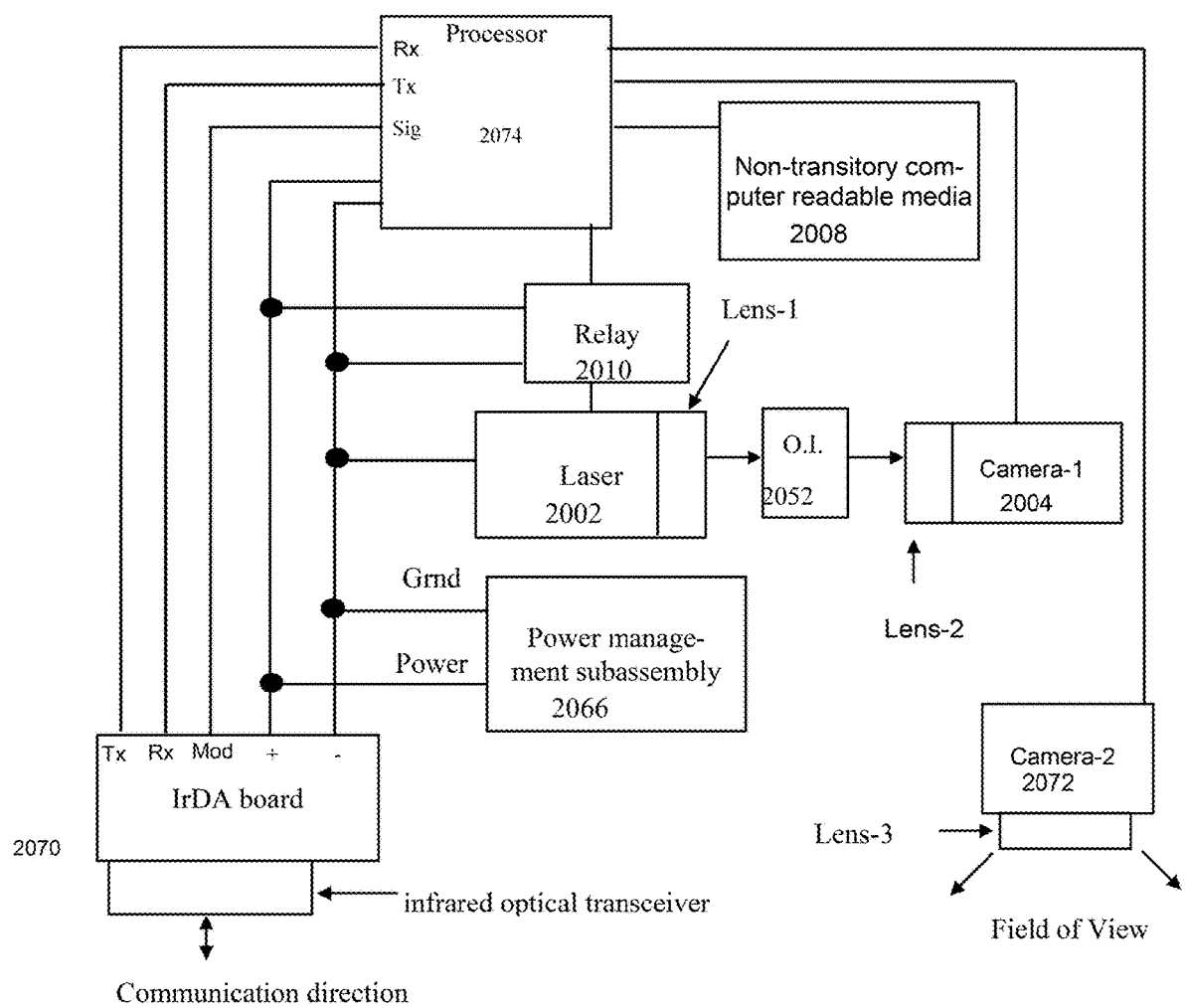
Figure 20. Shared processor.

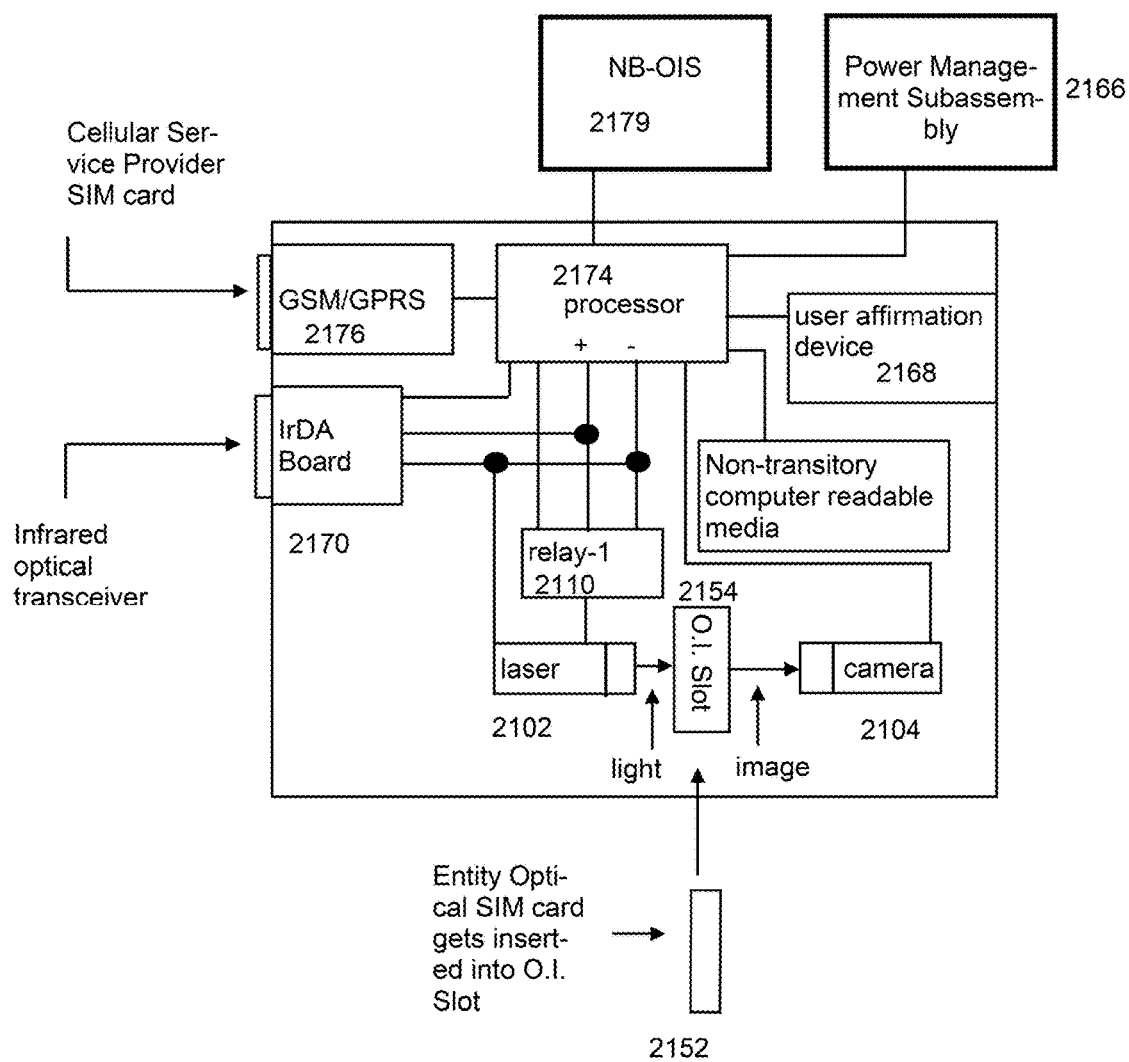
Figure 21. NB-C Adapted With An O.I. Slot.

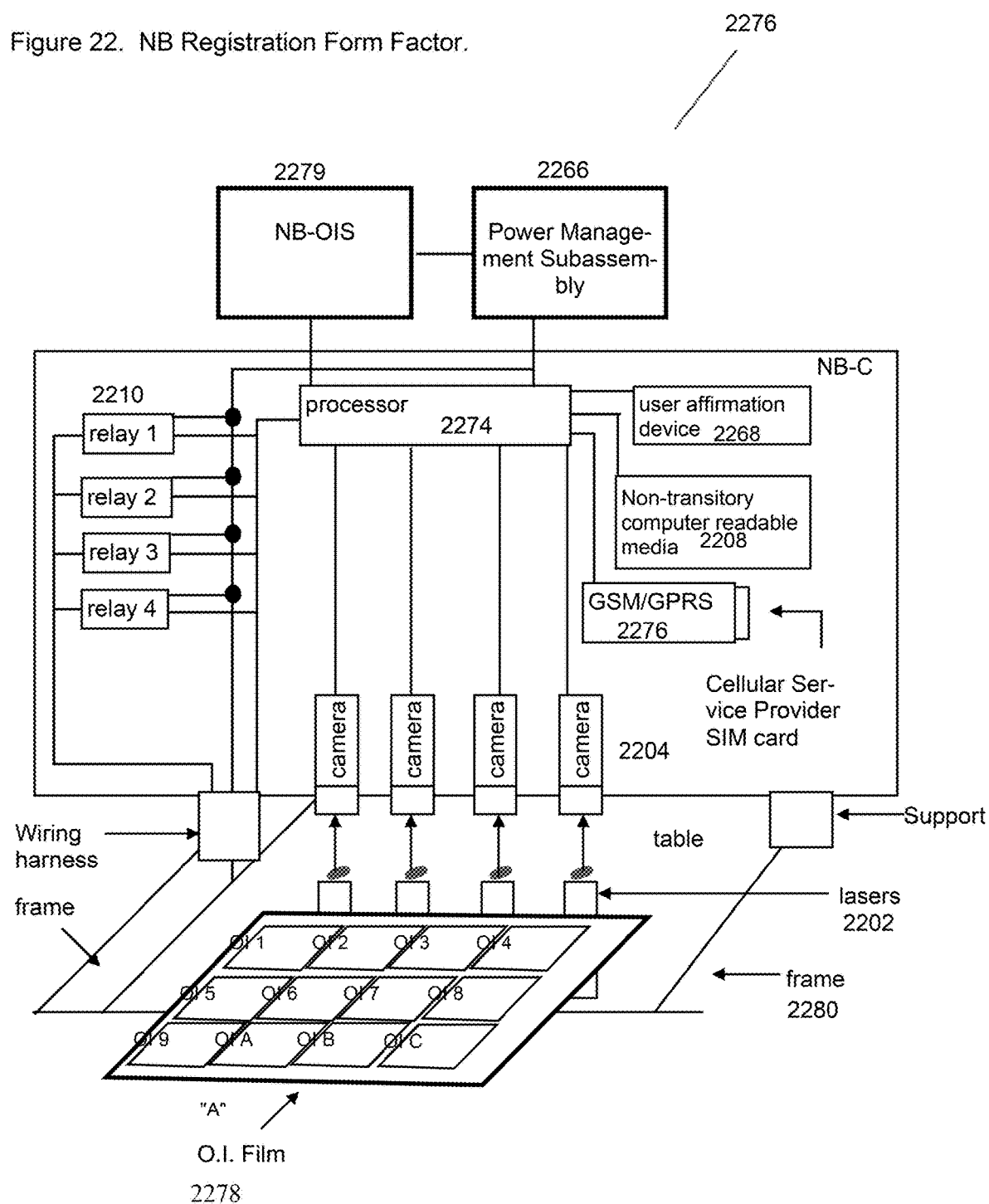
Figure 22. NB Registration Form Factor.

Figure 23A  QR-Code of an RSA Private Key
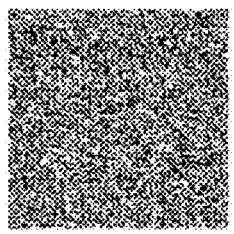
Figure 23B.  QR-Code of Random Data in Hex Format
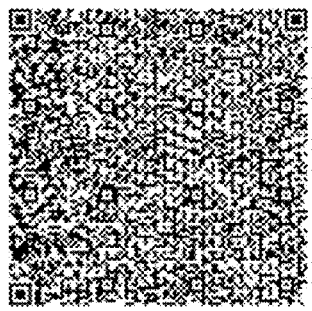
Figure 23C.  QR-Code of Machine Readable Object Code.
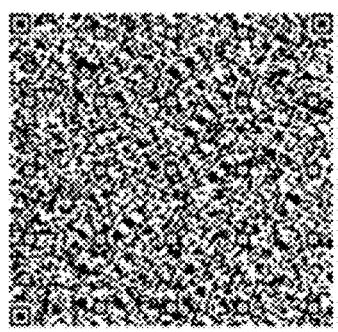

Example of Coherent Light Beam Split into Object Beam and Reference Beam

NB CONTROLLER AND FORM FACTORS

CROSS-REFERENCE TO RELATED APPLICATIONS

This application claims the benefit of priority to U.S. Provisional Patent Application No. 62/636,252, entitled NB Controller and Form Factors, which was filed on Feb. 28, 2018, the disclosure of which is incorporated by reference herein in its entirety. The following applications are noteworthy: U.S. Provisional Patent Application No. 62/636,232, entitled Optical Identifier and System for Reading Same, filed Feb. 28, 2018; U.S. Provisional Patent Application Ser. No. 62/396,332, filed Sep. 19, 2016, entitled Thing Machine; U.S. patent application Ser. No. 15/834,311, filed Dec. 7, 2017, entitled Thing Machine Systems and Methods; U.S. patent application Ser. No. 15/708,842, filed on Sep. 19, 2017, entitled Thing Machine; and U.S. Provisional Patent Application Ser. No. 62/626,917, filed Feb. 6, 2018 and entitled Optical Identity System and Methods. The disclosure in each of these applications is incorporated entirely by reference herein.

FIELD OF THE INVENTION

The present disclosure relates to an optical identifier and a system for reading and utilizing the optical identifier and/or information represented in or by the optical identifier.

BACKGROUND OF THE INVENTION

Security is becoming more and more important, particularly as computer systems and networks become more and more complex. There are a variety of ways to secure computer systems and networks and the data stored in and utilized by computer systems and networks.

SUMMARY OF THE INVENTION

In one aspect, a system includes a plurality of optical identifiers and a reader for the optical identifiers. Each optical identifier has an optical substrate and a volume hologram (e.g., with unique data, such as a code page) in the optical substrate. The reader for the optical identifiers includes a laser, and a camera. The laser is configured to direct laser light into a selected one of the optical identifiers that has been placed into the reader to produce an image of the associated volume holograms at the camera. The camera is configured to capture the image. The captured image may be stored in a digital format by the system.

In another aspect, a method includes directing light from a laser into a first optical identifier, where the first optical identifier comprises an optical substrate and a volume hologram in the optical substrate; and capturing an image of the volume hologram produced by the light from the laser with a camera. The captured image may be stored in a digital format, e.g., in a non-transitory, computer-based memory.

In another aspect, a system for reading information from an optical identifier includes one or more lasers, a camera, a processor, and a relay switch. The processor causes the relay switch to turn on, and deliver power to (and thereby turn on) the laser. The laser, once on, illuminates the optical identifier. The illumination provided by the laser creates an image of the volume hologram that the camera captures. The processor, in a typical implementation, triggers the camera to capture the image. The processor may then store the captured image, or some electronic representation of the captured image in a computer-based memory storage device. After the image is captured, the processor may causes or allows the laser to turn off.

In a typical implementation, the optical identifier is a solid piece of material (e.g., glass or the like) with a volume hologram incorporated into the solid piece of material. The volume hologram may include a code page of data (e.g., digital data) that uniquely represents to the system one or more real or virtual things (e.g., a person, an information resource, an object, a piece of data, an action, etc.). In various implementations, the code page of data may be a QR code. A few examples are shown in FIGS. 12A, 12B and 12C. Referring to FIG. 23A, the QR Code represents an RSA Private Key. Referring to FIG. 23B, the QR Code represents a set of raw bytes of random data. Referring to FIG. 23C, the QR Code represents machine readable object code.

In various implementations, the code page of digital data can include various types of information that may be utilized by the system (e.g., by the processor mentioned above, or by another processor in the system) in any number of ways. For example, as disclosed below, the digital data in the code page may include units of data, each of which is (or represents) an identifier (e.g., a uniform resource identifier (URI), etc.), content (e.g., HTML content), executable computer-readable instructions (e.g., computer code), or some other abstract or tangible thing.

In some aspects, a system includes a plurality of mobile optical identifiers, and a reader for the optical identifiers. Each mobile optical identifier has an optical substrate and a volume hologram in the optical substrate. The reader has a housing, at least one illumination device in the housing, a camera in the housing, and a fixed optical identifier between the at least one illumination device and the camera in the housing, wherein the fixed optical identifier comprises an optical substrate and a volume hologram in the optical substrate. The housing defines a slot for receiving any one of the plurality of mobile optical identifiers.

The at least one illumination device is configured to direct light into at least one of the fixed optical identifier and the mobile optical identifier in the slot of the housing to produce an image of corresponding to at least one volume hologram of the mobile or fixed optical identifier at the camera. The camera is configured to capture the image, wherein the captured image is stored in a digital format by the system.

In yet another aspect, a computer-based system includes a plurality of optical identifiers, and a reader for the optical identifiers. Each optical identifier includes an optical substrate, and a volume hologram in the optical substrate. The reader includes an illumination device and a first camera. The illumination device is configured to direct light into a selected one of the optical identifiers to produce an image of a corresponding one of the volume holograms at the camera. The first camera is configured to capture the image, and the captured image may be stored in a digital format by the system. A computer-based processor coupled to a relay that switches to control electrical power to the illumination device, and a second camera coupled to the computer-based processor.

In yet another aspect, a system is disclosed for registering a plurality of optical identifiers that are formed as an array of optical identifiers on an optical substrate film. Each of the optical identifiers has (unique) purely random data stored therein in a volume hologram in the optical substrate. The system includes lasers and cameras. Each laser is configured to direct light toward a corresponding one of the cameras so that when an area of the film that includes one of the optical identifiers is positioned between that laser and that camera, the laser directs light through the optical identifier to produce an image of data from the volume hologram in that optical identifier at the camera. One or more relay switches are configured to control delivery of electrical power to the lasers, and a computer-based processor is coupled to the lasers and the relay switches. The computer-based processor causes the one or more relay switches to switch to control the delivery of electrical power to the lasers. The cameras provide a digital representation of the images they capture to the computer-based processor, which processes the images and/or stores associated image data in a computer-based memory.

In still another aspect, a method of registering optical identifiers in a system is disclosed. The method includes providing a system for registering a plurality of optical identifiers in the form of an array of optical identifiers on an optical substrate film, wherein each of the optical identifiers has purely random data stored therein as a code page in a volume hologram in the optical substrate. The system includes lasers and cameras. Each laser is configured to direct light toward a corresponding one of the cameras so that when an area of the film that includes one of the optical identifiers is positioned between that laser and that camera, the laser directs light through the optical identifier to produce an image of data from the volume hologram in that optical identifier at the camera. One or more relay switches are configured to control delivery of electrical power to the plurality of lasers; and a computer-based processor coupled to the plurality of lasers and to the one or more relay switches.

The method further includes providing a plurality of optical identifiers in the form of an array of optical identifiers on an optical substrate film, where each of the optical identifiers has purely random data stored therein as a code page in a volume hologram in the optical substrate, and positioning the plurality of optical identifiers relative to the system for registering the optical identifiers such that each respective optical identifier in a first row of the array is between a corresponding one of the lasers and a corresponding one of the cameras.

Next, the method includes causing, with the computer-based processor, the one or more relay switches to switch so as to deliver electrical power to the lasers. The cameras capture digital representations of images produced of the code pages in the volume hologram when light from the lasers illuminate the volume holograms. In some instances, a code page is a vector or array of bits that can be represented in 1 or 2 dimensions spatially, that contain digital data. This data may be generated, in whole or in part, by a true random number generator, a key generator as part of a public key infrastructure (PKI), machine-readable code, an identifier, or other types of digital data as desired within the system. For example, the data may itself be generated by an identifier. The code page is read out of the optical identifier by a reader that shines light at a particular set of conditions to generate the constructive and destructive interference via phase shifting inside the optical identifier to create a pattern of light and dark pixels. This pattern then falls on a 1D or 2D series of detector elements sensitive to the reader's wavelength generating electrical signals that represent electrically the digital data that make up the code page. A code page can contain different segments of data, or multiple code pages can be combined to form a larger segment of data as needed.

The media used to create the optical identifier can be varied depending on the desired wavelength and geometry of read-out. Many materials are available for creating the optical identifier. Some are optically sensitized through treatments or dyes included in their bulk, others are pure materials that are exposed to recording wavelengths that change their physical parameters in order to generate localized changes in refractive index. Examples of materials that could be used to create an optical identifier include but are not limited to Bayer™ HX films, dichromated gelatin, acrylic glasses, photosensitized polymer glasses such as phenanthrene-doped poly-methyl methacrylates, titanium niobate, positive or negative photoresists, photosensitized glass fibers, and silica fibers when recorded with excimer laser energy.

The code pages are recorded using techniques known in the art to spatially modulate the beam in an interferometer to create a desired interference pattern inside the recording media. Other possible methods include polarization multiplexing, peristrophic multiplexing, phase-coded multiplexing, spot-shift multiplexing, wavelength multiplexing, and spatial multiplexing. Other methods are known, as are combinations of more than one method of multiplexing to include more than one code page of data. Any of these could be used.

Many multiplexing methods are known, including angle-multiplexing as an example of a recording method. A laser interferometer is constructed a spatial light modulator (SLM) in the signal beam of the recording interferometer, and to configure that spatial light modulator to display the desired bit pattern at the time of recording each code page.

The interferometer configuration can then be changed in angle so each exposure is associated with a different code page of light and dark pixels when the optical identifier is illuminated in reconstruction at a corresponding geometry. The laser wavelength and angle must both be selected to create the appropriate reconstruction conditions for the code page at the wavelength the identifier is to be illuminated at during readout. The recording wavelength must also be suitable for the media used to construct the optical identifier.

These geometries should, in general, conform to the Bragg condition due to the thickness of the optical identifier. Thus angle is associated with its own unique series of dark and white pixels in the reconstructed bitmap, representing the digital data of that code page. The Bragg condition for reconstruction at a different wavelength than the construction wavelength can be calculated using the approximate coupled wave approximation of Kogelnik, the text of which is incorporated here by reference (Bell System Technical Journal Volume 48, Issue 9, pages 2909-2947, November 1969.)

As in many embodiments of the present invention the optical identifier has substantial volume, a great deal of information can be stored within, and the range of angles a particular code page is read at the detector is extremely limited. For example, using the methods of Kogelnik, an optical identifier that is 0.5 mm thick (credit card thickness) viewed with a red laser diode will have a range of angles it will show the code page in, with angle on the order of −0.05 degrees. This is beyond the ability of human dexterity making the identifier difficult to tamper with outside its range of intended use. It is this quality that, in a typical implementation, allows the optical identifier to act as a security mechanism within the context of the IOT-Systems further described below.

It should be noted that the optical identifier may be multiplexed, and thus contain more than one code page for each angular position of the key as it is rotated. Each of these code pages may be used for a different purpose, or additional logic in the reader inside the lock may select a particular code page to be used out of a plurality of code pages as the identifying information.

As the identifier moves through angles, different code pages will be projected at the detector (camera lens). Each angle is thus associated with a different code page's reconstruction geometry per the Bragg condition.

In another aspect, a method of reading an optical identifier includes using a computer-based processor, for example, to cause a relay switch to connect power to (and thereby turn on) a laser. The light produced by the laser is directed toward an optical identifier (e.g., a solid piece of material that is translucent or transparent at least to the laser light) that has a code page of data (e.g., digital data) represented in a volume hologram in the solid piece of material. This produces an image that appears at a lens of a camera. The method further includes using the computer-based processor to cause or trigger the camera to take a picture of the image. In some implementations, the method includes storing the image, or digital data that represents the image, in a computer-based memory device. Moreover, in some implementations, the method also includes, after the image has been captured, causing (or allowing) the relay switch to disconnect power from (and thereby turn off) the laser).

In some implementations, one or more of the following advantages are present.

For example, the systems and techniques disclosed herein make it easy to transfer information (e.g., a code page) that is stored in one medium (e.g., a volume hologram in an optical identifier) into another medium (e.g., into digital data that can be stored by a computer-based system).

In some implementations, the systems and techniques disclosed herein do not require precise alignment between the optical identifier (e.g., in a volume hologram) and detector pixels. This is because the camera and lens are in a fixed position kinematically mounted in close proximity to the optical identifier during exposure and then confirming that the data can be read by the camera when directly observing the object beam (data code page) before exposure. After exposure, the reference beam reconstructs the optical identifier when the hologram is kinematically mounted in the same location relieving the need for precise alignment or an alignment procedure.

In some implementations, the systems and techniques disclosed herein use a camera having a high resolution array of pixels and the hologram is imaged onto the array with a lens. One advantage of this is that the entire optical identifier can be read out simultaneously as opposed to mechanically scanning for sequential readout. Additionally, the reference beam can be very low in power and the lens can be very small due to the high sensitivity of the camera.

Another advantage present in some implementations is that the virtual image in the optical identifier is not visible to the naked eye. The convergence of the optical identifier may be such that without a very short focal length camera and lens, the optical identifier cannot be seen. It also has an advantage in that the image is virtual so a card placed in the image plane, for example, will not show the code sheet (e.g., the information represented in the optical identifier). (One alternative would be to reconstruct a real image that could be imaged onto a sheet of ground glass).

Another advantage, in some implementations, is that the system uses a fixed lens to image the optical identifier. This has several advantages. For example, the first one is that the virtual image can be collimated (if the lens is a collimating lens) before focusing onto the detector array. This reduces the distortion of the image and makes interrogation of the optical identifier by itself difficult. The lens and camera become integral to the reading of the optical identifier. Another advantage of using a fixed lens is that minor position variations of the optical identifier generally do not prevent the data code page from being read. There is a larger position variation possible during assembly which allows for less expensive and faster production.

According to one aspect, a system includes:
1. a power management subassembly (pms) that includes a power source (e.g., a DC battery) or an access point to a power source (e.g., an AC mini USB port);
2. computer-based memory;
3. an illuminating device;
4. a switch (e.g., a relay switch) coupled to the pms and adapted to switch on and off the illuminating device;
5. a communication bus;
6. an optical identifier (OI) having a code page and positioned so that when the switch is closed, the illuminating device turns on and emits a beam of light to interrogate the code page and produce a projected image;
7. a digital camera coupled to a processor, where a lens of the imaging assembly of the digital camera is positioned to capture a representation of the projected image on the camera lens.

According to another aspect, computer-readable instructions that represents a method (and the method itself that may be implemented by a system that includes a processor executing computer-readable instructions) that includes: 1. providing a signal to a relay switch to close and thereby provide power to an illuminating device (e.g., a laser) to generate a beam of light to interrogate a code page represented in an optical identifier and produce a projected image; 2. actuating a camera to capture a representation of the projected image as digital data; 3. optionally, storing the digital data in computer-based (e.g., non-transitory) memory; and 4. disabling the signal to the relay switch to turn off the beam of light; and 5. interacting with (e.g., processing) the digital data. Some implementations include enabling a processor to perform actions required to satisfy and/or facilitate the algorithmic steps of the foregoing procedure. In a certain implementations, the above-referenced process may relate to, or be applied to help establish or confirm identity (e.g., of a person), authentication of identity, authorization, authentication of authorization, and/or auditing. Code pages representative of digital data may be interrogated to generate corresponding units of digital data (e.g., in non-transitory memory) as digital data that can be acted upon by a computer-based processor, for example, executing computer-readable instructions. In a typical implementation, the interrogation will include the algorithmic steps of the above-mentioned process.

BRIEF DESCRIPTION OF THE DRAWINGS

FIG. 1 is a schematic representation showing one exemplary implementation of an optical identification system (OIS) including some of the system's components.

FIG. 2 is a schematic representation showing another exemplary implementation of an OIS with solder points.

FIG. 3 is a schematic representation of yet another exemplary implementation of an OIS micro with micro USB power.

FIG. 4 is a partial schematic representation of still another exemplary implementation of an OIS that has mirrors.

FIG. 5 is a partial schematic representation of another exemplary implementation of an OIS that has mirrors and a mirror housing.

FIG. 6 is a partial schematic representation of an exemplary implementation of an OIS with a reflective hologram.

FIG. 7 is a schematic perspective view of an exemplary optical identifier unit.

FIG. 8 is a schematic representation showing two examples of optical identifier holding apparatuses.

FIG. 9 is a schematic representation showing an exemplary OIS with a holding apparatus for an optical identifier.

FIG. 10 is a schematic representation showing an exemplary OIS with an optical identifier holding apparatus with a reflective back surface.

FIG. 11 is a schematic representation of using duel reference beams.

FIG. 12 is a schematic representation showing yet another exemplary implementation of an OIS on a circuit board.

FIG. 13 is a schematic representation showing another exemplary implementation of an OIS with a laser array.

FIG. 14 is a see through perspective view of an implementation of a housing.

FIG. 15 is a schematic representation an implementation of a NeurBot (NB) controller.

FIG. 16 is a schematic representation another implementation of a NeurBot (NB) controller.

FIG. 17 is a partial schematic representation of an implementation of a mobile personal NeurBot (NB) with a user affirmation device.

FIG. 18 is a partial schematic representation of another implementation of a mobile personal NeurBot (NB) with a user affirmation device.

FIG. 19 is a partial schematic representation of an implementation of a NeurBot.

FIG. 20 is a schematic representation of an implementation of a system that includes a shared processor.

FIG. 21 is a schematic representation of at least part of an implementation of a system that includes a computer-based processor connected to a computer-based memory.

FIG. 22 is a schematic representation showing an implementation of an optical identifier registration system and a film that includes an array of optical identifiers moving through the optical registration system.

FIGS. 23A-23C are examples of code pages of data.

Like characters represent like elements.

DETAILED DESCRIPTION

Figure 24:
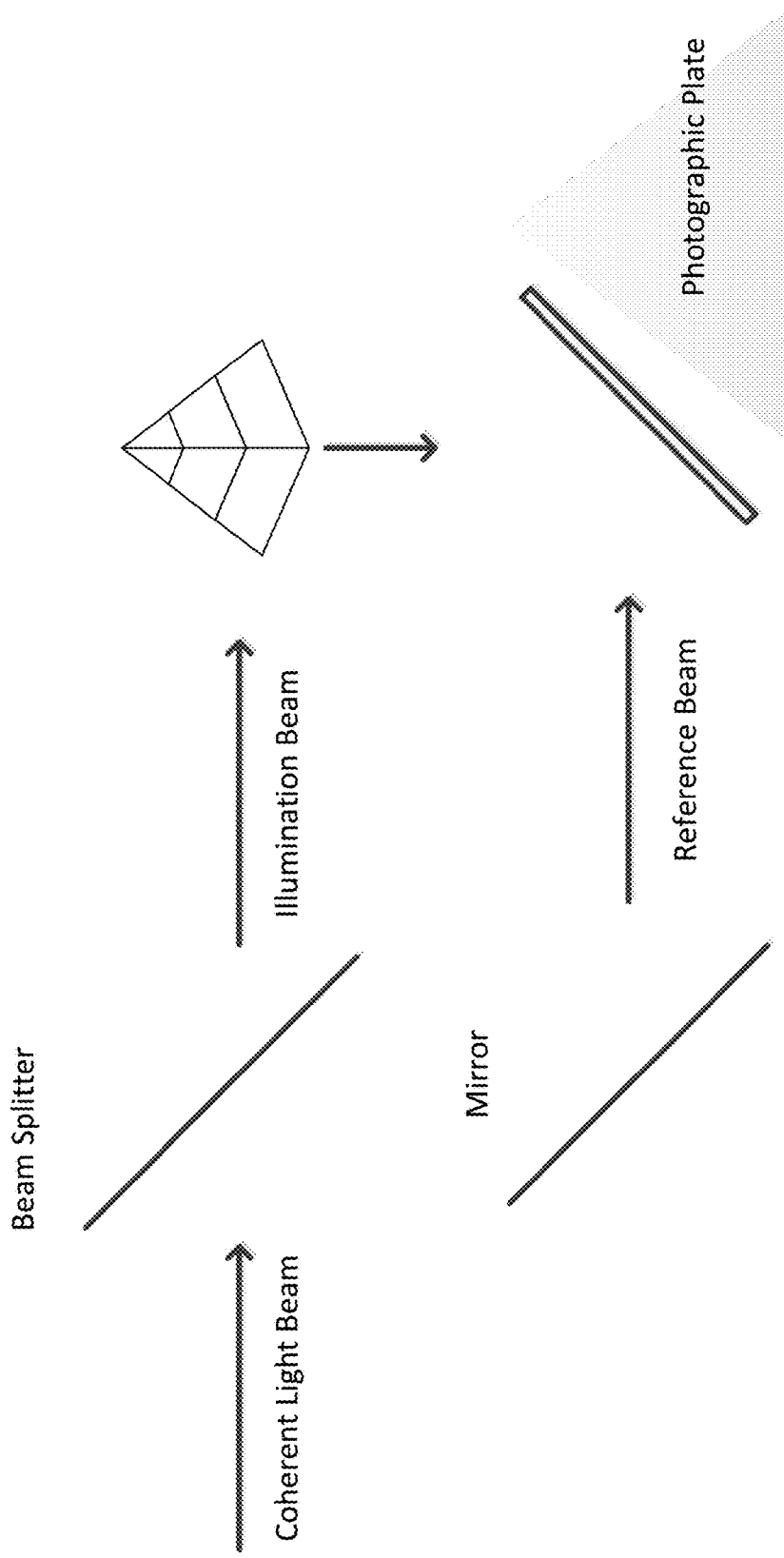
FIG. 24 is a schematic representation of a system for recording a volume hologram in an optical medium.

The systems and techniques disclosed herein have potentially broad applications. One particular application would be a use in connection with Graph of Things (GoT) technology, developed by NeurSciences, LLC. At a high level, GoT technology provides a framework to create, integrate, manage, and automate models about various Things. In GoT technology, a Thing represents something a machine can do as an action or something that an action can act upon. Related Things are organized in GoT technology to form a Graph of Things (GoT), and related graphs can be linked together to create a more sophisticated multi-dimensional GoT. This GoT is essentially an expandable digital brain that can be used by software-based GoT AI Agents (i.e., Neur-Bots, or simply NBs) that are connected to the GoT. The Things that are present in this digital brain represent the agent's knowledge (and abilities) at any given moment in time.

In general, each NB starts with the same general knowledge as every other NB. Each NB can evolve in a different direction from being an AI Agent with general knowledge to an AI Agent with highly specialized knowledge about a specific domain, such that, after some time has passed, any two NBs in a particular network may have very different sets of knowledge (and abilities). U.S. patent application Ser. No. 15/708,842, entitled Thing Machine, discloses certain additional information about Neurbots, Things, etc. That information in particular is incorporated by reference herein in its entirety.

Human users can use computers, laptops, tablets, and smart phones, to securely connect to their NBs. In this regard, each NB has its own unique identifier that a network of NBs can recognize; that unique identifier may be stored, for example, in a volume hologram on an optical substrate (e.g., a piece of glass or the like). Moreover, other Things and/or people may be assigned their own unique identifiers that are recognizable by a network of NBs; these identifiers too may be stored in volume holograms on optical substrates. Optical substrates can be used to store other types of data in the form of volume holograms.

In a typical implementation, the volume hologram is a hologram where the thickness of the recording material (e.g., glass or other optical substrate) is much larger than the light wavelength that was used to record the hologram. The data storage capacity of a volume hologram on an optical substrate is enormous. Therefore, the identifiers and other data discussed above that may be stored in a volume hologram on an optical substrate can be very long, which makes the inventory of possible identifiers very large and makes the identifiers and system that utilizes those identifiers very secure. In some implementations, an identifier in a volume hologram may have 20,000 bits or more.

There are many other potential advantages to storing this kind of information in a volume hologram on an optical substrate and adapting a system to be able to access and utilize the information. For example, volume holograms on optical substrates are largely impervious to electromagnetic pulse (EMP) attacks, surface scratches, and radio-frequency identification (RFID) interrogation. Moreover, volume holograms on optical substrates are fire resistant, and can be made shatter resistant. The data stored in a volume hologram on an optical substrate can be used for a variety of purposes—in an NB network or otherwise. For example, in various implementations, the data can be used to boot a machine or network to some predetermined state automatically, as an optical subscriber identification module (or SIM card), as a passport, as a driver's license, as an employee identification card, as an event entry card (or ticket), etc. In some implementations, different volume holograms on optical substrates can be logically paired, such that one optical identifier can be used by a network of NBs, for example, to authenticate a second optical identifier, for example. Many other uses are possible.

In some implementations, the NB is configured to operate according to a model of human cognition and/or to utilize blockchain-based technology to create a truly personalized, intelligent assistant or the like, that can learn, communicate, and/or conduct commerce on behalf of itself or its owner. In some implementations, a network of identifiable, secure, and smart NeurBot-based personal assistants may be utilized to unlock economic opportunities that span across all industries.

In a typical implementation, a NeurBot uses a NeurBot graph controller for its digital brain. There may be two basic models: a deterministic model and a non-deterministic model. The deterministic model provides well-defined behavior and tightly controls what the NeurBot can, and cannot do. The non-deterministic model enables the Neur- Bot to behave differently. In such implementations, the NeurBot graph controller organizes everything the NeurBot knows as a graph. The nodes in the graph may represent things that the NeurBot can do as actions, and things that the actions can act upon. In performing an action, the NeurBot graph controller can change the graph of what the NeurBot knows.

A NeurBot can be taught some basic goals to achieve, and, by performing actions, it can try to achieve those goals. It can be taught that some goals are more important than others, even for a brief moment in time. For example, one may want a particular NeurBot to be very interactive with a person, but otherwise spend its time reading digital books. Sometimes, goals can conflict, such as being interactive with a person or answering a call. The NeurBot can be taught to muse about the things that it knows and the things that it does not know, in order to better organize its thoughts and to identify areas that it should focus on learning or reasoning about.

Each NeurBot may evolve at its own pace. In some environments, it will learn faster than in others. A NeurBot with really good sensors, for example, can learn quite a bit about its environment, and adapt to its environment. NeurBots can also be designed to meet each other, and to share information. Essentially, like a student, a NeurBot can learn from a teacher.

Certain implementations of NeurBots are described in detail in U.S. patent application Ser. No. 15/708,842, which was filed on Sep. 19, 2017, and is entitled Thing Machine. That application, and particularly the material describing Neurbots and Things or Thing Machines in that application, is hereby incorporated by reference (and enclosed) in its entirety.

The systems and techniques disclosed herein can be utilized and applied to NeurBots and in NeurBot environments to facilitate identifying and/or representing within the NeurBot environment various things (e.g., identities, objects, actions, etc.). In this regard, information representing those things can be incorporated into a hologram (e.g., a volume hologram), and accessed (or read) and processed by the various components/systems disclosed herein that might feed the information into the NeurBot environment for example, In a typical implementation, a volume hologram is a type of photographic recording of a light field, and it is used to display a fully three-dimensional image of the holographic subject, which is seen without the aid of special glasses or other intermediate optics. The image is usually unintelligible (e.g., not visible) when viewed under diffuse ambient light. It is an encoding of the light field as an interference pattern of seemingly random variations in the opacity, density, or surface profile of the photographic medium. When suitably lit (e.g., with a laser), the interference pattern diffracts the light into a reproduction of the original light field and the objects that were in it (e.g., that represent the thing) appear to still be there, exhibiting visual depth cues such as parallax and perspective that change realistically with any change in the relative position of the observer.

In a typical implementation, a volume hologram is a hologram that is incorporated into some volume of material (e.g., a glass block), as opposed to a flat surface. In a typical implementation, utilizing a volume hologram, instead of a flat hologram, enables the incorporation of far more data, which may be desirable because the data representing the associated things can be much more complex and, therefore, more secure. Also, utilizing a more complex scheme for representing the associated things provides for a greater vocabulary for identifying different things.

At a high level, the optical identification system OISs (e.g., NB-OIS) disclosed herein is a system that is configured to access and/or process information stored in volume holograms on optical substrates. The OIS may be connected to a NeurBot, or into a NeurBot environment or network to facilitate identifying different things. This is one use of the OIS disclosed herein. However, it may be used in other applications, as well.

FIG. 1 is a schematic representation showing one exemplary implementation of an optical identification system (OIS) 100.

The illustrated OIS 100 includes: a laser 102, a camera 104, a computer-based processor 106, a computer-based memory 108, a (normally-open) relay switch 110, and a communication bus 112. An optical identifier 114 (incorporated into a volume hologram on an optical substrate) is positioned between the laser 102 and the camera 104. In a typical implementation, the volume hologram can be removed easily by hand from its position between the laser 102 and the camera 104, and a different volume hologram (with a different optical identifier 114) can be put in its place. In the illustrated implementation, the computer-based processor 106 is coupled to the communication bus 112, to the camera 104, to the relay switch 110, and to the computer-based memory 108, and the relay switch 110 is connected to the laser 102. By way of example but not limitation the computer based processor can be a Raspberry Pi 3 Model B+ Mini Computer with High Performance Heatsink Set configured with a Raspberry Pi Camera.

In some implementations, the OIS 100 will include a physical holder or guide to receive, and hold, the optical identifier 114 between the laser 102 and the camera 104. The physical holder or guide may help ensure that any optical identifier placed therein is positioned correctly relative to the laser 102 and the camera 104 to ensure that an image of the data on the optical identifier is produced by virtue of the laser impinging the optical identifier 114 and is captured by the camera 104.

In a typical implementation, during operation, the processor 106 may receive an instruction (e.g., via the communication bus 112) to read or access information in the optical identifier 114, which is positioned, as shown, between the laser 102 and the camera 104. In response to receiving this instruction, the processor 106 sends a signal to the relay switch 110 that causes the relay switch 110 to close and thereby deliver electrical energy to the laser 102 causing the laser to turn on. In some instances, the instruction may be generated automatically when the optical identifier is positioned between the laser and camera.

When the laser 102 turns on, the laser 102 delivers laser light through its lens 2 toward the camera 104. In one implementation, this may include a 5 mW 532 nm Green Laser Module (3V 11.9 mm) from FastTech. Since the optical identifier 114 (with the volume hologram) is positioned between the laser 102 and the camera 104, the laser light passes through the optical identifier as it travels from the laser 102 toward the camera 104 creating a projected image (of the volume hologram) at a downstream side of the optical identifier 114. This projected image ends up at the lens 1 of the camera 104.

In a typical implementation, the processor 106, in response to receiving the instruction to read or access information in the optical identifier 114, also sends a signal to the camera 104 that causes the camera to capture the projected image at a time that corresponds to the projected image being produced at the lens 1 of the camera 104. The instruction that is sent to the camera 104 may be sent at the same time as, or shortly thereafter, the instruction is sent to the laser 102. In response to the instruction, the camera 104 takes a digital picture of the representation of the projected image, and, in a typical implementation, the processor 106 stores digital data representing the projected image in the computer-based memory 108.

In a typical implementation, after the laser 102 has been on for a certain period of time (typically very briefly, e.g., less than a millisecond or two), the processor 106 causes the relay switch 110 to open, thereby cutting off power to the laser 102 and causing it to stop producing the laser light. This, of course, terminates the projection of the image onto the lens 1 of the camera 104.

The data in the optical identifier 114 (in the volume hologram) can take any one of a variety of different forms. In one example, the data in the optical identifier 114 forms or includes a code page. A code page may be, e.g., a table of values that describes a character set used for encoding a particular set page may be a table of characters from a set of characters such as the set of ASCII characters. A code page may be an image. A code page could be a representation of analog data. Pretty much anything a picture can capture can be a code page. In some implementations, a code page is a QR code. of characters, which may be combined with a number of control characters.

The computer-based memory can be used to store the digital data captured by the camera 104 and/or to store instructions (e.g., machine code) for certain processor 106 operations.

In certain exemplary implementations, an OIS may include:
1. computer readable media having machine code (and/or other data) stored therein;
2. a processor with memory configured to load and perform machine code from said media, during boot (e.g., the initial set of operations that a computer system performs when turned on), where the processor is connected to a relay switch that is connected to a laser, where machine code-triggered action of the processor enables or delivers a signal to the relay switch to enable the laser light (e.g., turn on the laser light beam), and, subsequently disables the signal to relay switch, e.g., to turn the laser light beam off);
3. the laser connected to the relay switch, where the laser is (preferably optimally) positioned so that when the processor enables the relay switch, the relay switch will enable or cause the laser to emit a laser light beam onto the surface of an optical identifier to illuminate a code page (stored as a volume hologram on an optical substrate of the optical identifier) to produce a projected image of the code page on a lens-1 of a digital camera; and where
4. the processor is connected to the digital camera, where the processor signals the camera to capture a representation of the projected image (e.g., by enabling an aperture subassembly of the camera) as digital data, which can be, and typically is, then stored in memory. With respect to the aperture subassembly, in some implementations, a device called a diaphragm usually serves as an aperture stop, and controls the aperture. The diaphragm functions much like the iris of the eye—it controls the effective diameter of the lens opening. A lower f-number denotes a greater aperture opening which allows more light to reach the film or image sensor.

Moreover, in certain exemplary implementations, in response to receiving on the communication bus 112, a communication representative of a request for the processor to perform an action, the processor performs machine code-triggered actions of:
1. signaling the relay switch to cause the laser to emit a light beam onto the surface of the optical identifier to illuminate the optical identifier under a particular set of conditions that include wavelength during reading, angle, polarization state of the reader beam, how the identifier is rotated about the axis of illumination, and other reconstruction parameters, and produce an image of the data (e.g., code page) from the optical identifier projected onto lens-1 of camera;
2. signaling the camera to take a digital picture of the representation of the projected image for storing as digital data in memory;
3. signaling the relay switch to disable the laser light (or simply removing the previously-applied signal) so that the relay switch opens);
4. algorithmically interacting with the digital data to generate a response to the request in memory; and,
5. communicating a representation of the response over the communication bus.

The foregoing processes, in some implementations, are intended to cover the case where a raspberry pi processor is executing machine code that interacts with an electromagnetic waveform device such as but not limited to a wireless receiver or a microphone, to receive a communication representative of a communicated request for the processor machine code to consider. The machine code considers the request by evaluating the request in the context of things in its vocabulary to compute a performable statement, and then performs machine code that performs the performable statement. This may result in a non-empty response. The machine code then performs the format machine code to format the response. The machine code then interacts with an electromagnetic waveform devices, such as but not limited to the wireless transceiver or a configured speaker, to communicate a representation of the response as the response to the request.

In various embodiments, the communication bus 112 can be wired (by way of example but not limitation: a serial bus; an i2c bus; a bus wired to a mobile device dock or installed within an appliance's housing), can be wireless (using protocols such as Bluetooth, Zigbee, LoPAN, WiFi, or other wireless communication protocols), or can include a combination of wired and wireless communication technologies.

FIG. 2 is a schematic representation showing another exemplary implementation of an OIS 200. The OIS 200 in FIG. 2 is similar to the OIS 100 in FIG. 1. For example, the OIS 200 in FIG. 2 has the same basic components as the OIS 100 in FIG. 1 including a laser 102, a camera 104, a computer-based processor 106, a computer-based memory 108, a relay switch 110, and part of a communication bus 112. In some implementations, there is a physical holder or guide to hold the optical identifier between the laser 102 and the camera 104. However, in the OIS 200 of FIG. 2, these NB-OIS 200 components are configured (e.g., mounted) on a circuit board 214. with power (+) and ground (−) leads being connected to solder points (or terminals) 216a, 216b on the circuit board 214, and one or more communication ports (connected to a communication bus) provided as one or more solder points (or terminals) 216c on the circuit board 214. In one embodiment, a clock line (e.g., SCL) and a data line (e.g., SDA) of an i2c communication bus are used as the communication bus 112. In a second embodiment the transmit (Tx) and receive (Rx) lines of a serial communication bus are used as the communication bus 112. In a third embodiment, the Tx, Rx lines are used along with a signal line as the communication bus 112.

FIG. 3 is a schematic representation showing another exemplary implementation of an OIS 300. The OIS 300 in FIG. 3 is similar to the OIS in FIG. 2. For example, the OIS 300 in FIG. 3 has the same basic components as the OIS 200 in FIG. 2 including a laser 102, a camera 104, a computer-based processor 106, a computer-based memory 108, a relay switch 110, and part of a communication bus 112, and all of these components are configured (e.g., mounted) on a circuit board 214. In some implementations, there is a physical holder or guide to hold the optical identifier between the laser 102 and the camera 104. The communication bus 112 in FIG. 3 includes an i2c clock line (e.g., SCL) and an i2c data line (e.g., SDA). Moreover, the power (+) and ground (−) lines of the NB-OIS 300 are connected to a micro USB (e.g., Female) Jack Port Socket Connector 316, and SCL and SDA are connected to solder points. Other embodiments can use other types of power connectors.

In certain embodiments, the NB-OIS (e.g., 100, 200, 300, etc.) and/or any or all of the NB-OIS components can be fabricated as a SOB (system on board). The SOB can be placed in a housing to secure the SOB and the NB-OIS components within the housing. The housing can be fabricated for the size of the SOB, and have exterior Tx and Rx solder points, for example, connected through the housing to the Tx and Rx of the NB-OIS board. Similarly, the housing can be fabricated to enable (or include) a power management system to provide power to the NB-OIS board, such as a cut-out for a micro USB jack to extend from the board through the housing, enabling a micro USB adapter to be connected through the cut out. For a reference design showing this type of connection, see, for example, the Raspberry Pi 3 micro USB jack. The phrase "power management system" should be construed broadly herein to include virtually any kind of power supply, such as a battery, an AC adaptor, etc. that provides the power to run the system (e.g., without overloading it).

There are many housings available that may serve this purpose or be adapted to serve this purpose. One example is a Pi-Supply Pi Poe Case, from Allied Electronics & Automation.

In some embodiments, one or more of the lines Tx, Rx, Power (+), Ground (−), are connected to general-purpose input/output (GPIO) pins positioned to enable a jumper wire to be pushed through a cut-out in the housing onto a said pin. The jumper wire extends from the pin, out through the housing. In a typical implementation, a GPIO pin is a generic pin on an integrated circuit or computer board whose behavior—including whether it is an input or output pin—is controllable by the program at run time.

In some embodiments, the housing is designed to house an NB-OIS board that is connected to a portable battery power management subsystem with a battery that is connected to a QI charging receiver. QI is an open interface standard that defines wireless power transfer using inductive charging over short distances. In a typical implementation, the system may use a charging pad and a compatible device, which is placed on top of the pad, charging via resonant inductive coupling. The QI charging receiver is placed with the housing such that the QI charging receiver will be within the manufacturer specification of required proximity to a Universal Qi Wireless Charging transmitter when the housing is placed on a said transmitter to enable the battery to be wirelessly charged. The housing can be fabricated for the size of the SOB. The connection of the Tx and Rx lines from the board to the exterior of the housing can be through the use of solder points or pins to which jumper wires can be attached. In some implementations, an alternative type of connection may be used.

FIG. 4 is a schematic representation showing part of an exemplary OIS 400. The part of the OIS 400 shown in FIG. 4 has a laser 102 (with lens 2), a camera 104 (with lens 1), an optical identifier 114, and mirrors 418a, 418b. The mirrors 418a, 418b, in the illustrated implementation, are configured to direct laser light exiting the optical identifier toward the lens 1 of the camera 104. More particularly, in the illustrated implementation, the laser 102 emits a light beam from lens-1 onto optical identifier (O.I.) to illuminate an embedded hologram as an image onto a reflective front surface of mirror-1 418a that reflects off of mirror-1 418a onto a reflective front surface of mirror-2 418b, which is positioned to further reflect the image onto lens-1 of camera-1. The mirrors in the illustrated implementation are front surface mirrors, meaning that the front surfaces of those mirrors (that are shown to be reflective in the illustrated figure) are, in fact, reflective.

The mirrors in the configuration shown in FIG. 4 are configured so that the laser light travels in a first direction from the laser lens 2 to mirror-1 418a, so that the laser light travels in a second direction (orthogonal to the first direction) from mirror-1 418a to mirror-2 418b, and in a third direction (parallel to, but opposite the first direction) from mirror-2 418b to the lens-1 of camera 104.

The configuration in FIG. 4 represents only one of many possible OIS configurations that could involve mirrors. Indeed, any number of mirrors (e.g., one or more) may be configured and used to direct laser light along a path from the laser, through the optical identifier, and to the camera. In some implementations, one or more of the mirrors may be positioned "upstream" (on the laser light path) from the optical identifier. In some implementations, one or more of the mirrors may be positioned "downstream" (on the laser light path) from the optical identifier. In some implementations, one or more of the mirrors may be positioned "upstream" (on the laser light path) from the optical identifier, and one or more of the mirrors may be positioned "downstream" (on the laser light path) from the optical identifier. Some implementations may include (in addition to or instead of the one or more mirrors), one or more other types of optical elements (e.g., lenses or the like) to direct, focus, collimate, etc. the laser light in a desired manner. Any such optical elements (mirrors, lenses, or the like) can have a variety of different physical and optical configurations.

FIG. 5 is a schematic representation showing part of an exemplary OIS 500. The OIS 500 in FIG. 5 is similar to the OIS 400 in FIG. 4. For example, the OIS 500 in FIG. 5 has a laser 102 (with lens 2), a camera 104 (with lens 1), an optical identifier 114, and mirrors 418a, 418b. Additionally, mirror-1 and mirror-2 in the OIS 500 of FIG. 5 are placed in a retractable mirror housing 520 such that an action can be performed to move the housing to expose lens-1 of the camera 104. In some embodiments, the action may include lifting, sliding, pushing, pulling, turning, etc. The action may be mechanical, electrical, or manual.

This can serve several purposes. Firstly, in some embodiments, the laser light interrogates the hologram and projects an image onto the mirror which is then bounced onto another mirror and then back to the camera. If the mirror housing is moved, then the image might be projected in a straight line. This means we could effectively project the image outside of the current unit if we put a small hole in the raspberry pi housing unit (at the correct position of course). If we can project it to the external world, then we could use this to communicate with an external machine. Secondly, if we move the mirror housing, it means we could have a clear line of site back to the camera. Again, a second similar device could have its mirror housing retracted, and it could project an image onto the camera of this first unit. The idea is similar to "pairing" but done optically.

The mirror housing 520 can be positioned to enable the O.I. 114 to be interrogated and the mirror housing retracted to enable the camera lens-1 field of view to not be obstructed by the mirror housing 520. In a handheld unit, the operator can retract the mirror housing and use the device to produce an image onto a second device's camera to optically communicate information from the first device to the second device. In some implementations, one can build a raspberry pi with the relay, laser, camera, mirror housing, and power management system provided by a battery. One can put all this in a housing, and then you have a handheld version of the device.

FIG. 6 is a schematic representation showing part of an exemplary OIS 600. The part of the OIS 600 shown in FIG. 6 has a laser 102 (with lens 2), and a camera 104 (with lens 1). An optical identifier 114 is positioned in a light path from the laser 102 to the camera 104. There is a reflective surface 602 at a side of the optical identifier 114 opposite the side of the optical identifier 114 where the laser light enters the optical identifier 114. A volume hologram (with a code page, for example) in inside the optical substrate of the optical identifier 114 between the surface of the optical substrate through which the laser light passes and the reflective surface 602 inside the optical substrate, or on the reflective surface 602. The reflective surface 602 can be part of a mirror or can be reflective coating, for example. Both the laser 102 and the camera 104 are angled relative to the optical identifier 114 and the reflective surface 602 is configured such that laser light from the lens 2 of the laser 102 can pass through the optical identifier 114 at an angle, reflect off the reflective surface 602 at another angle and reach the lens 1 of the camera 104 directly. The reflective surface 602 in the illustrated implementation is substantially parallel to the surface of the optical substrate through which the laser light passes.

Thus, in the illustrated implementation, during operation, the laser 102 produces a laser beam and emits that laser beam from lens-2 onto optical identifier (O.I.) 114. The laser light enters the optical identifier 114 through its front surface. Inside the optical identifier, the laser light illuminates a volume hologram that may be coated on or affixed to a reflective backing or placed in front of a mirror. The laser light exits the front surface of the optical substrate and creates an image on lens-1 of camera 104. The camera 104 captures the image. Generally speaking, in a reflection hologram, a reference wave and an object wave entering an emulsion (or light sensitive coating) from different sides produces interference fringes in planes that are parallel to the plane of the emulsion. The image can be observed by viewing the reflection from the plate.

In some embodiments, the image (e.g., of the code page or other data in the volume hologram) is a real image. In some embodiments, the image is a virtual image. In optics, a virtual image is an image formed when the outgoing rays from a point on an object always diverge. The image appears to be located at the point of apparent divergence. Because the rays never really converge, a virtual image cannot be projected onto a screen. In contrast, a real image is one that is formed when the outgoing rays form a point converging at a real location. FIG. 7 shows an exemplary implementation of an optical identifier that includes an optical substrate 721 and a volume hologram 722 in the optical substrate 721. The illustrated optical identifier may be manufactured with a section of the unit (or optical substrate) removed (to form a cut-out section) and the hologram 722 is placed on a material (e.g., another piece of optical substrate) that can be affixed over the cut out section. One can think of it like a credit card (e.g., a flat substrate) with a hole in the middle of it. The hologram is placed onto a sticky adhesive that is placed over the hole. This way, when the light (e.g., laser light) hits it, the image can be transmitted out the other side.

FIG. 8 shows two different holding apparatus configurations for an O.I. Any one of these holding apparatuses can be used to hold an optical identifier in place in any of the optical identification systems (e.g., 100, 200, 300, etc.) disclosed herein. Referring to FIG. 8, the O.I. 114 can be positioned in an O.I. holding apparatus (e.g., a channel 824a or a tray 824b) appropriately positioned between the lens of an illuminating device (e.g., laser), and the lens of a camera. In one embodiment, the O.I. holding apparatus 824a is a channel with a flat bottom and two sides that extend orthogonally, in an upward direction from opposite sides of the flat bottom. The channel is dimensioned so that the optical identifier 114 can be slid (in an upright configuration, as shown) into the channel, and so that the two sides of the channel contact or are very close to the front and rear surfaces of the optical identifier 114. In a second embodiment, the holding apparatus 824b is a tray 824b with a transparent core, a cut-away core, or other such design where the optical identifier 114 can be securely placed; and where the laser can be positioned to illuminate the optical identifier 114 and project the image onto the camera lens. The tray 824b in the illustrated implementation has a flat bottom surface and four side surfaces that extend orthogonally in an upward direction from the bottom surface. The holding apparatus can be manufactured in other form factors as well, and may be configured as required for the purpose of the desired assembly.

In a typical implementation, the holding apparatus, whatever its configuration, is in a fixed position relative to the laser, or the camera, and, preferably, both. This way, when the optical identifier 114 is positioned in the holding apparatus, the optical identifier will be correctly positioned to be read. An example of this is represented in FIG. 9.

The system represented in FIG. 9, includes an O.I. reader holding apparatus (H.A.) 924 such as a mount, where an O.I. can be positioned within the mount to enable interrogation of the O.I. volume hologram.

In some implementations, the holding apparatus 924 has a contact switch (not shown) that is configured so that when contact with the contact switch occurs (as might happen when the O.I is placed into the holding apparatus), the contact switch is triggered, which results in the laser 102 turning on and emitting a light beam onto the volume hologram of the O.I. positioned in the holding apparatus, to produce an image on lens-1 of camera 104. In some implementations, the contact switch will also be configured such that contact with the contact switch (e.g., when the O.I. is placed into the holding apparatus) causes the camera to capture any image being projected onto its lens. More particularly, the camera aperture apparatus can be enabled to take a picture of the image as digital data to be stored in non-transitory memory. In various implementations, the contact switch may be positioned in the bottom surface of the holding apparatus or in any side surface of the holding apparatus.

In other implementations, the holding apparatus may include a non-contact sensor (instead of the contact sensor mentioned in the previous paragraph) to sense the presence of an optical identifier in the holding apparatus. Examples of non-contact sensors are capacitive sensors, infrared sensors, etc. In those implementations, the non-contact sensor may be configured to perform a function similar to the function described above as pertaining to the contact sensor.

In one embodiment, the O.I. is permanently mounted in the holding apparatus 924. In a second embodiment, the O.I. is easily removable from the holding apparatus. For example, one can place a hologram into a holding apparatus, and encase the whole thing in a housing. This means the manufacturing process for a IoT device can be assembled to mass produce things with a hologram already built in. Each device would include machine code that can use the hologram to provide the device with an identity and identifiers.

FIG. 10 is a schematic representation showing part of an exemplary optical identification system (OIS) 1000 for reading an optical identifier. The part of the OIS 1000 shown in FIG. 10 has a laser 102 (with lens 2), a camera 104 (with lens 1) and a holding apparatus 1024 for an optical identifier (having a volume hologram therein, as described herein). There is a reflective surface 1026 at a side of the holding apparatus 1026 opposite the optical identifier. During operation, the laser 102 transmits light at a first angle (e.g., between 20 and 80 degrees from normal to the front surface of an optical identifier in the holding apparatus 1024. The light passes through the optical identifier in the holding apparatus, is reflected back off of the reflective surface 1026 at a second angle (the same as the first angle, but in the opposite direction), and passes back through the optical identifier. The reflected light exits the optical identifier and impinges lens 1 of camera 104. The camera 104 captures an image of the volume hologram based on the reflected light.

In the FIG. 10 implementation, the holding apparatus includes the mirror backing (or reflective surface) so that the optical identifier itself does not need a reflective backing. In some implementations, however, the optical identifier might have a reflective surface on one side thereof, and, in those implementations, the holding apparatus would not need to include the mirror backing (or reflective surface) to produce a reflected hologram.

Some embodiments may forgo the holding apparatus and simply have the laser lens on the exterior of the device housing and the camera lens on the exterior of the device housing so that a user can simply hold a reflective hologram up to the machine and have the laser light beam positioned to interrogate the hologram and the reflective coating reflect the image onto the camera lens. In such an implementation, the processor (executing the machine code) periodically runs the camera's machine code driver to cause the camera aperture apparatus to capture an image, and attempts to algorithmically decode the image code page as digital data. In some implementations, this is the case where it is looking for a QR code to scan. So it periodically is running the machine code to take a picture, and attempting to see if it can recognize a QR code.

In some embodiments, a processor may be configured to perform (e.g., by executing computer-readable instructions) the following steps (which may be performed in this sequence):

1. signaling a relay switch to provide power to the laser 102 and thereby cause the laser 102 to emit a light beam onto the surface of an (appropriately positioned) optical identifier O.I. 114 to illuminate the optical identifier 114 under a particular set of conditions (e.g., including wavelength during reading, angle, polarization state of the reader beam, how the identifier is rotated about the axis of illumination, and other reconstruction parameters), and create an image projected onto lens-1 of camera 104;
2. signaling the camera 104 to take a digital picture of the projected image as code page digital data, which may be stored in memory; and
3. signaling the relay switch 110 (or allowing the relay switch) to discontinue providing power to the laser 102 and thereby disabling the laser light (e.g., after the digital picture has been taken).

The code page digital data captured in the digital picture taken by the camera can be used by the system (e.g., the NO-OIS 100) in a variety of ways.

For example, in some embodiments, the code page digital data is stored once in the computer-based memory 108 and may be accessed and interacted with as needed using algorithmic steps embodied as machine code (e.g., performed by the processor 106). In those embodiments, the code page digital data may be retained in the computer-based memory until the NB-OIS (e.g., 100) is shutdown, and/or beyond that point. Thus, the code page can be retained in memory so that whenever any algorithmic step (e.g., a step of any algorithm being executed by a computer-based processor, for example) requires the use of the data, it is already in memory and need not be reimaged.

In some embodiments, the processor 106 (executing machine code), or other processor(s), may perform actions to generate a random number (e.g., by using a random number generator), encrypt the code page digital data (using the random number), and retain the random number in the computer-based memory so that the stored random number can be used later (e.g., by the processor 106, or some other processor) to decrypt the encrypted code page digital data when required. This is so that if the machine were hit with a memory grab, for example, then the memory may not have the decrypted content of the code page. In an embodiment, machine code (software) is performed to generate a cipher key, such as but not limited to using a pseudo random number generator algorithm. The processor further executes machine code designed to perform the algorithmic steps of a cipher that acts upon the cipher key and the digital data representative of the code to cipher the data. This is so that if the machine were hit with a memory grab, for example, then the memory may not have the decrypted content of the code page.

In yet another example, in some embodiments, the code page digital data is retained in the computer-based memory 108 for a relatively short period of time only to enable the processor 106 to perform algorithmic steps of a procedure that requires or relies upon the code page digital data, and is then unset (deleted) from the computer-based memory 108. In these types of embodiments, the machine code may cause the processor 106 to perform actions of:

6. signaling the relay switch 110 to connect power to (and therefore cause) the laser 102 to emit a light beam onto the surface of an appropriately positioned optical identifier O.I. 114 to illuminate the optical identifier 114, which produces an image that is projected onto lens-1 of camera 104;
7. signaling the camera 104 to take a digital picture of the representation of the projected image as code page digital data, which may be stored in the computer-based memory 108; and, 8. signaling the relay switch 110 to disconnect power from the laser 102 and thereby disable the laser light (after the digital picture has been taken);
9. performing one or more algorithmic steps of a procedure (e.g., embodied as machine code) that involves accessing and interacting with the code page digital data to set a second memory required in performing an algorithmic step; and
10. after the procedure is performed, executing machine code to overwrite the code page digital data in the computer-based memory (e.g., with all zeros).

In an embodiment, machine code is performed to generate a cipher key, such as but not limited to using a pseudo random number generator algorithm. The processor further executes machine code designed to perform the algorithmic steps of a cipher that acts upon the cipher key and the digital data representative of the code to cipher the data. This is so that if the machine were hit with a memory grab, for example, then the memory may not have the decrypted content of the code page.

Moreover, in an embodiment, the algorithmic steps of a procedure, embodied as machine, are performed by the processor to perform the steps of accessing and interacting with the code page of digital data to set a second memory required in performing an algorithmic step of a procedure. By way of example, but not limitation, the memory may be representative of a boot block address required by a procedure to boot a machine, a key to cipher data, or a hash key to match against the computed hash of a second memory.

In some implementations, an optical identifier includes a single code page of digital data. However, in some implementations, a single volume hologram (in a single optical identifier) includes more than one single code page of digital data. And the foregoing embodiments can be adapted to capture and process more than one single code page of digital data (e.g., simultaneously). By way of example but not limitation, the embodiment can configure the laser to use multiple wavelengths and or position it for multiple angles. Similarly, an embodiment can use multiple light emitting devices and cameras.

Code Page Digital Data as Units of Digital Data

The code page digital data can include a set of units of digital data where a unit of digital data is an embodiment of digital data in non-transitory memory that an implementation of an algorithmic procedure, embodied as machine code, can act upon. Thus, for example, there can be multiple discrete units of digital data wherein a first machine code might act upon a first unit, and a second machine code might act upon the second. The data representation typically is dependent on the base numbering system used. For example, in decimal, the data is 0-9, in hex 0-16. Note that in hex, 0-16 is 0-F. Thus, in hexadecimal 16 may be written as F so hex includes 0-9 and A-F. The data may be encoded as a QR-Code and, if that is the case, then the volume hologram image may look like a QR code. The benefit is a QR Code has built in error checking. Note though, it does not have to be QR Code. Some alternative with built in error checking could be used.

Each one or more units of digital data in a code page of digital data can be an identifier, content, machine code, a thing (or representative of a thing), and/or a unique identifier. Digital data can be treated as if it were one unit of data, like all the digital data that represents a single photo. Alternatively, it can represent units of digital data such as an identifier, content, machine code, a thing, a unique identifier, etc.

Unit of Digital Data as an Identifier

In some embodiments, one or more of the units of digital data (in a code page of digital data) can be recognized (e.g., by the OIS or by an NB network connected to the OIS) as an identifier. By way of example, but not limitation the identifier may conform to a published specification such as:
1. An Internet Society published standard, in which case, the one or more units of digital data may be:
   a. an International Resource Identifier as defined, for example, by the current published Internet Society Standards Organization, such as RFC 3987; or,
   b. a Uniform Resource Identifier as defined by the current published Internet Society Standards Organization, such as RFC 3986;
2. An International Standard, such as the International Mobile Subscriber Identity as defined by the International Mobile Subscriber Identity (IMSI) Oversight Council (IOC);
3. A GS1 standard, in which case, the one or more units of digital data may be GS1 Identification Keys, EAN/UPC, (International or European Article Code/Universal Product Code).

Unit of Digital Data as Content

In some implementations, one or more of the units of digital data can be representative of digital content (e.g., stored in non-transitory memory). By way of example, but not limitation, the digital content may conform to a published specification such as:
4. HTML 5.1 2nd Edition, W3C Recommendation 3 Oct. 2017;
5. Extensible Markup Language (XML) 1.0 (Fifth Edition), W3C Recommendation 26 November 2008;
6. A WHATWG HTML specification, such as Microdata; or
7. A schema.org specification such as a published Schema.

Digital Data and Machine Code

In some implementations, one or more of the units of digital data can be (or be representative of) machine code that the processor (e.g., 106) can execute to perform an associated action. In one example of such an embodiment, the machine code can be for a program that is executable by a computer processor (e.g., 106). The system may load the program (machine code) into executable memory (e.g., computer-based memory 108) for performing (e.g., by the processor 106).

In this regard, the NB-OIS processor 106 may perform actions comprising the steps of:
8. loading a unit of digital data representative of machine code into executable memory (e.g., computer-based memory 108); and,
9. performing one or more actions based on the machine code loaded into the executable memory.

In this regard, the NB-OIS processor 106 may perform actions comprising the steps of: computing by interrogating an optical identifier a unit of digital data representative of machine code; loading said code into executable memory; and, performing said machine code. This method precludes malware from being injected into the encoded machine code after the optical identifier has been produced.

In some instances, the machine code (i.e., that was encoded into the hologram) is dynamically loadable machine code (such as a shared library or a dynamic link library) and the machine code is dynamically loaded and performed. Dynamic loading is a mechanism by which a computer program can, at run time, load a library (or other binary) into memory, retrieve the addresses of functions and variables contained in the library, execute those functions or access those variables, and unload the library from memory.

Dynamic loading allows a computer program to start up in the absence of these libraries, to discover available libraries, and to potentially gain additional functionality.

In some implementations, one or more of the units of digital data is an identifier representative of an entry point in code (e.g., the dynamically loadable machine code), where the machine code is loaded into executable memory and the entry point resolves to an executable address in the executable memory, and the NB-OIS processor performs actions in accordance with the machine code at the address.

In some implementations (e.g., in a Thing Machine), one or more of the units of digital data are representative of a statement that a first verb action can parse as a first graph of Things that a second verb action can evaluate in the context of the domain of discourse to compute a second graph of Things representative of a performable statement that a third verb action can cause the performance thereof. In a Thing Machine embodiment machine code is performed to manage a set of Things each as a unit of non-transitory memory wherein each Thing is comprised of the same set of components including a first identifier, a value, and a relationship set describing how a first Thing relates to a second Thing. A Thing representative of performable machine code is referred to as a machine verb action and the Thing's identifier is a name representative of the action. A machine verb action can act upon a set of Things referred to as machine nouns. A Thing can be representative of a machine vocabulary including machine verbs, machine nouns, and other Things that modify meaning. A set of Things can represent a statement. The Thing Machine's vocabulary includes:

- an "interrogate" machine verb to perform the action of interrogating an optical identifier to compute code page digital data;
- a "parse" machine verb to perform the action of parsing the digital data to compute a Thing representative of a statement;
- an "evaluate" machine verb to perform the action of evaluating the statement in the context of the machine vocabulary to compute a performable statement; and
- a "perform" machine verb to act upon the performable statement Thing to perform a machine verb identified in the performable statement.

In some implementations, one or more of the units of digital data is (or represents) a statement that can be performed by a computer processor executing machine code representative of an interpreter. By way of example, this may be a statement that a Linux bash shell can interpret and act upon.

Digital Data as a Thing

In an embodiment of a Thing Machine (from NeurSciences LLC), one or more of the units of digital data can be representative of Things that a P(TM(i)) can act upon. A P(TM(i)) may be considered a process that can be performed by a Thing Machine.

By way of example, but not limitation, a unit of digital data can be (or represent):
- an authorization;
- machine code to be loaded into the processor 106 and performed by the processor 106;
- a URI;
- a URR;
- a symmetric key;
- an asymmetric public key;
- an asymmetric private key;
- a cipher key;
- a hash key;
- a performable action;
- a statement to be parsed;
- a request for the processor to evaluate;
- a primary key for a database lookup;
- an identifier;
- a machine code; or
- content to be acted upon by a Thing Machine.

Unique Identifiers

A unique identifier (UID) is a sequence of characters that is associated with, and identifies to the system, one or more entities, for example, within the system. A driver's license number in a given state, an employee badge number in a company, a bank account number within a particular bank, and a unique serial number of a subscriber identification module (SIM) card are examples of unique identifiers.

In some implementations, the processor 106, for example, can execute machine code to act upon an identifier to compute a unique identifier. By way of example, but not limitation, the processor may perform in accordance with machine code to act upon a representation of a first identifier, and a representation of a second identifier, to compute a third identifier such as by performing a hash procedure. An exemplary implementation of an algorithmic procedure that may be performed by the processor executing machine code includes the actions of:

10. computing a candidate unique identifier (and saving it, e.g., in non-transitory memory);
11. searching a set of previously-computed, issued unique identifiers (e.g., in non-transitory memory loaded, e.g., from non-transitory computer readable media), to compare the candidate unique identifier to the members of said set; and
12. if candidate unique identifier is in the set of issued unique identifiers, then discarding the candidate unique identifier and continuing the action sequence starting at step 1; or
13. if the candidate unique identifier is not in the set of issued unique identifiers, adding the candidate unique identifier to the set of issued unique identifiers (e.g., in the non-transitory computer readable media).

Step 2 here may be performed, for example, to make sure that the candidate is not already in existence.

This may include computing a hash key as a candidate unique identifier (and saving it, e.g., in non-transitory memory). Essentially, a hash key is computer, and then the operating system is used to "create" an API to try and create a file by this name. If the file already exists, then the create API fails so the system concludes that the identifier is not unique.

In some embodiments, the unique identifier can be a unit of digital data, and an operating system service can be used to ensure the candidate identifier is unique (i.e., step 2, above, i.e., it does not already exist in a set of issued unique identifiers). By way of example, an operating system service can create a file in a file system with a file name representative of the candidate unique identifier. If the file already exists, then the operating system's create file service will fail and the machine code will continue with step 1 (above). Note that in this embodiment, the set of issued unique identifiers is the set of created files.

A representation of the issued unique identifier can be used to identify a Thing in a Thing graph as administered by a P(TM(thing)) of a P(TM) of a Thing Machine where machine code causes a processor to perform the action of:

1. performing machine code to compute an asymmetric public key and private key, key pair (and storing it, for example, in memory);

2. performing machine code to interact with the asymmetric public and private keys, and issued unique identifier (e.g., in memory), to generate (and store, e.g., in memory) a representation of a certificate signing request including a representation of said public key and of said issued unique identifier;
3. performing actions, based on the machine code, to interact with the certificate signing request to compute an issued certificate (e.g., to be stored in memory);
4. recording in a file (e.g., in computer readable media) the issued certificate (or a representation thereof) where the filename of the file is (or represents) the unique identifier; and
5. recording in a second file (e.g., in computer readable media) the private key (or a representation thereof) where the filename of the file is (or represents) the unique identifier and where the filename has a suffix identifier, such as ".pkey" or ".private".

Some instances include the algorithmic procedures of a data storing and/or executing a retrieval model, such as the procedures associated with a data access object, a file system, a DBMS, or cloud service such as Amazon's cloud service, embodied as machine code, to provide the action of storing either the digital data itself, or a representation of it (such as an encoded version) such that, a processor executing machine code can subsequently retrieve the representation.

Some embodiments include the algorithmic procedures of non-transitory computer readable media data management such as to set a representation of digital content in, or on, the media; to get the representation; and/or to unset the representation.

In some embodiments, the systems and/or techniques disclosed herein enable representing a unique identifier to be encoded in a volume hologram and subsequently decoded (e.g., and stored into memory). The number of character positions within the identifier, and the number of possible characters in each position can be sufficiently long to create a large set of possible unique identifiers. Furthermore, a pure random number generator and, or analog device capturing random noise in nature, such as atmospheric noise, can be computationally used to further create uniqueness of the identifier.

Holographic memory, including, for example, volume holograms, has the potential of high capacity data storage. In various implementations, information may be recorded such that all the data is recorded in multiple parts (or every part) of the hologram so if part of the hologram is damaged or unreadable, the data can still be recovered. Data can also be multiplexed by wavelength or by angle or incident light on the same area. In those instances, the OIS may be configured to move the media (i.e., the optical identifier) or change the laser wavelength being provided to the volume hologram during reading. In instances where the media is to be moved, the optical identifier can be moved to access different data by an electrical motor (controlled by the processor, for example) that rotates or otherwise moves the holding apparatus during reading. In addition, or alternatively, if different wavelengths are to be provided to read the volume hologram, the laser (or a laser assembly, with different lenses, for example) may be configured to provide different wavelengths of light into the optical identifier, under control of the processor. In some instances, the data in a particular volume hologram may be stored in parallel and read in parallel so all the data can be read at once which makes holographic memory extremely fast. In one implementation, one or more bar codes and/or QR codes may be recorded into a volume transmission hologram. A camera then observes the virtual image/images when reconstructed with laser which is interpreted by software to convert the image to text. Thereby, this QR code can be used as a "key" to encode private data and gain access to public data.

In one implementation, one or more bar codes and/or QR codes may be recorded into a volume transmission hologram. An illuminating device interrogates the hologram to project an image. A camera then observes the virtual image/images when reconstructed with laser. Machine code is performed to interact with the camera to capture a representation of the image as digital data which is interpreted by machine code that computes and saves in memory a representation of the corresponding text.

In some implementations, the systems and techniques disclosed herein provide a secure means of storing data which cannot be readily read without the aid of an optical interrogator (e.g., OIS). The optical interrogator thus becomes integral to the data storage. In some implementations, the data storage is accomplished by using holographic memory (e.g., a volume hologram in an optical substrate) which is fast, secure, and difficult to reproduce or copy, has high data density, is very small, and is very inexpensive. The holographic memory can be used as a key to encrypt private data, a key to access public data, data or a source of data in itself, etc. It can be used as a secure data key storage for Bit coin transactions or credit card data.

In some implementations, an optical interrogator (OI) comprises: a) a coherent light source (e.g., a laser), b) a diverging lens, c) one or more mirrors, d) a volume hologram of a QR code (or bar code, or some other data format), e) a camera, f) a laser/computer interface, g) a computer (e.g., Raspberry PI), and h) software for converting, e.g., the QR code to text or data. The volume hologram can be a transmission hologram of a QR code. The volume hologram can be a reflective hologram of a QR code. The volume hologram can be a transmission hologram of a bar code. The volume hologram can be a reflective hologram of a bar code.

In some implementations, the holographic QR code stores some number of characters (e.g., 256 or more) that can be imaged by the camera and interpreted by QR code reader software. In some implementations, the holographic memory is no greater than 5 mm×5 mm.

The converted text can be used as a "key" to encrypt private data. The converted text can be used as a "key" to allow access to public data. In some implementations, a volume hologram can be used to store a QR code as an encoding key to encrypt private data. In some implementations, a volume hologram can be used to store a QR code as a software "key" to enable access to public data.

In some implementations, the systems and techniques disclosed herein involve an optical identifier that has more than one code page in the optical identifier, and using more than one laser beam to illuminate the more than one code page (either simultaneously or sequentially). An example of this kind of system is shown in FIG. 11. The system in FIG. 11 includes two lasers 1102a, 1102b that are directed toward the optical identifier 114 from two different directions. Each of the two lasers 1102a, 1102b is controlled (i.e., turned on and off) based on input from its own relay switch 1110a, 1110b. These relay switches can be configured to energize the lasers sequentially or simultaneously. The camera is controllable to capture an image whenever any one of the lasers is being energized. A power source is shown in the form of a battery 1150.

In some such implementations, the more than one laser beam can be controlled to readout different multiplexed code pages represented in the volume hologram with no moving parts. Using multiple code pages in a single optical identifier, and more than one laser beam to illuminate those multiple code pages, can increase the amount and types of information that can be stored in a single optical identifier.

There are many ways in which one or more volume holograms can be recorded into an optical medium. In one example, a laser beam is split into two parts (see, e.g., FIG. 24). One part illuminates with linear polarization an object mask of a QR code is made using ground glass and opaque material. Holographic recording material is placed a short distance away from this illuminated mask and normal to it. The second part is slightly diverged or converged or collimated based on the reconstruction wavelength and illuminates the hologram at an offset angle (typically 45 degrees to 55 degrees). After development, the hologram can be placed in the optical interrogator where the hologram may be illuminated with the reference beam. This illumination is at the same angle and the construction if the reconstruction wavelength is the same but will greater if the reconstruction wavelength is longer and smaller if the reconstruction wavelength is shorter. The size of the QR code image is larger if the reconstruction wavelength is longer and the QR code image is smaller if the reconstruction wavelength is shorter. One of the unique features of this QR code is the extremely low noise. The low noise is achieved through unique construction geometry and allows the storage of 256 characters or more to be stored in the QR code and read by the camera in the optical interrogator.

FIG. 12 is a schematic representation showing yet another exemplary implementation of an optical identification system (OIS) 1200.

The illustrated OIS 1200 is similar in many ways to the OIS 200 in FIG. 2. For example, OIS 1200 has: a laser 1202 (with a lens), a camera 1204 (with a lens), a computer-based processor 1206, a computer-based memory 1208, a (normally-open) relay switch 1210, and a communication bus 1212. An optical identifier 1214 (incorporated into a volume hologram on an optical substrate) is positioned between the laser 1202 and the camera 1204. In the illustrated implementation, the computer-based processor 1206 is coupled to the communication bus 1212, to the camera 1204, to the relay switch 1210, and to the computer-based memory 1208, and the relay switch 1210 is connected to the laser 1202.

Additionally, FIG. 12 shows that OIS 1200 has a power bus 1250 connected to power terminals (e.g., soldered terminals) on the computer-based processor 1206, the relay switch 1210, and the laser.

FIG. 12 also shows that the power bus 1250 and the communications bus 1212 include communication terminals (e.g., soldered terminals) for external connection (e.g., to SCL and SDA lines for the communications bus 1212 and to a power management subassembly for the power bus 1250). Though it isn't shown, in some implementations, the power bus 1250 is connected to the camera 1204 as well. The power management subassembly can be virtually any kind of source of electrical power for the components of the OIS 1200. In an exemplary implementation, the power management subassembly may include a battery compartment for holding one or more batteries and a battery charging circuit coupled thereto.

FIG. 13 is a schematic representation showing yet another exemplary implementation of an optical identification system (OIS) 1300.

The illustrated OIS 1300 includes lasers 1302a, 1302b, a camera 1304, a computer-based processor 1306, a computer-based memory 1308, relay switches 1310a, 1310b, communication buses and power buses. The illustrated OIS 1300 has a holding apparatus 1352 for a fixed optical identifier 1314, and a slot 1354 for temporarily receiving a mobile or removable optical identifier (not shown in the figure). In some implementations, the mobile or removable optical identifier may be an optical identifier having a volume hologram with data that the system can recognize as identifying a particular person (e.g., the owner of the mobile or removable optical identifier).

The computer-based processor 1306 executes computer-readable instructions stored in computer-based memory 1308 to control one or more functionalities of the OIS 1300 and/or its various components. The control may be provided in response to, and based on, inputs from sensors (e.g., a contact or position sensor for the optical identifier slot 1354) and/or commands entered by a human user (via a user input device, such as a keyboard or touchscreen, etc., not shown in the figure).

The lasers 1302a, 1302b and the camera 1304 in the illustrated implementation are positioned relative to the fixed optical identifier 1352 such that at least one of the lasers 1302a,1302b illuminates a volume hologram in the fixed optical identifier 1314a to produce an image of data (e.g., one or more code pages) from the volume hologram at the camera 1304. Likewise, the lasers 1302a, 1302b and the camera 1304 in the illustrated implementation are positioned relative to the slot 1354 such that at least one of the lasers 1302a, 1302b can illuminate a volume hologram in a removable optical identifier (not shown) in the slot 1354 to produce an image of data from the volume hologram at the camera 1304.

More specifically, in the illustrated implementation, laser 1302a illuminates a volume hologram in the fixed optical identifier 1314a to produce an image that includes data (e.g., one or more code pages) from the volume hologram at the camera 1304. Laser 1302a also illuminates a different volume hologram in the removable optical identifier (not shown) in slot 1354 to produce an image of data from the volume hologram at the camera 1304.

Moreover, in the illustrated implementation, laser 1302b is configured to illuminate a volume hologram in a removable optical identifier (not shown) in slot 1354 to produce an image of data from the volume hologram at the camera 1304. Laser 1302b, in the illustrated implementation, does not illuminate the volume hologram in the removable optical identifier in slot 1354 to produce an image thereof at camera 1354.

There are a variety of ways that the OIS 1300 can be configured to ensure that laser 1302b does not illuminate the volume hologram in the removable optical identifier in slot 1354 to produce an image thereof at camera 1354. For example, the laser 1302b may simply be oriented relative to the slot 1354 such that the laser beam it produces does not physically impinge the optical substrate of the optical identifier in slot 1354. As another example, the laser 1302b may be configured to produce a beam of light having a wavelength that the volume hologram of the removable optical identifier does not respond to (so, no image thereof would be produced). As yet another example, the laser 1302b may be oriented relative to the slot 1354 such that the laser light does not produce an image of the volume hologram in the removable optical identifier because of the angle or direction of light passing through the optical identifier from the laser 1302b.

Thus, in a typical implementation, the OIS 1300, when both lasers are operational (i.e., producing light beams directed at the optical identifiers, produces an image at camera 1304 that is a composite of data from the volume hologram of the fixed optical identifier 1314a and data from the volume hologram of the removable optical identifier. In a typical implementation, the system may be configured to recognize, for example, a machine associated with the data from the volume hologram of the fixed optical identifier 1314a and a person associated with the data from the volume hologram of the removable optical identifier. Accordingly, when the OIS reads a combination of a fixed optical identifier 1314a and a removable optical identifier, the system may be configured to understand that the associated person is utilizing or interacting with the associated machine.

In some implementations, the computer-based processor 1306 is configured to cause the lasers 1302a, 1302b to turn on (and produce laser beams) at the same time. In those implementations, the composite image produced by the simultaneous illumination of lasers 1302a, 1032b may be recognized by the system as indicating that the associated person is utilizing or interacting with the associated machine.

In some implementations, however, the computer-based processor 1306 is configured to cause the lasers 1302a, 1302b to turn on sequentially (e.g., without any simultaneous illumination). In those implementations, the system may be configured to recognize a sequence of images thereby captured by the camera 1354 may be recognized by the system as indicating that the associated person is utilizing or interacting with the associated machine.

The dual laser configuration in FIG. 13 is only one of many possible multi-laser and/or multi-optical identifier configurations. In various implementations, an OIS can include any number of lasers. Moreover, the OIS can include or accommodate any number of optical identifiers. Each laser can be configured to deliver light to any one or more of the optical identifiers from any one of a variety of possible angles or directions. Moreover, each laser can be configured to deliver light at any one or more of a variety of possible wavelengths. The various different volume holograms can be responsive to different wavelengths of light and from light coming in from different directions. In some implementations, the OIS may include more than one camera. In such implementations, the cameras can be arranged in a variety of ways. In some implementations, one relay and/or one processor may be configured to control more than one laser and/or more than one camera. In some implementations, separate relays may be provided to control, for example, individual lasers (and, e.g., the camera).

In a typical implementation, the OIS 1300 would be connected, at its control terminals (SCL, SDA), to a Neurbot (NB) controller, and would be connected, at its power terminals, to a power management system.

An OIS circuit board, for example, can be placed in a housing or enclosure to protect against dust, debris, and/or light pollution interfering with the illumination of the code page, for example. The size and complexity of the housing and enclosure may depend in part on the size of the processor and/or other components used, the number of lasers included, and the desired distance between the laser and the camera. There are many different form factors that the housing or enclosure might take, and many different materials that the housing or enclosure might be made from including, for example, plastic and metal.

One example of an enclosure 1450 for an OIS is represented in FIG. 14. The illustrated enclosure (shown in a partially explode view) is a cuboid. An upper surface of the cuboid defines a slot 1454, through which an optical identifier (e.g., a person's identifying optical identifier) can be inserted. The slot 1454, in the illustrated implementation, has a rectangular shape. In a typical implementation, an optical identifier inserted into the slot 1454 would lie in the path of light from a laser to a camera inside the enclosure 1450. The enclosure 1450 has a first cutout 1455 at a first end panel thereof for one or more communication lines to pass through the enclosure 1450 (to an external NB controller, for example). The enclosure 1450 has a second cutout 1456 for passage of power lines including a power and ground, for example, to an external power management system, and/or passage of other conductive lines to an external user affirmation device (UAD).

In a typical implementation, the enclosure 1450 may house or contain a laser, a camera, a computer-based processor, a computer-based memory, a relay switch, a communication bus and a power bus.

FIG. 15 is a schematic representation of an exemplary NB controller 1560.

The illustrated NB controller 1560 has a computer-based processor 1562 and a computer-based memory 1564. The computer-based processor 1562 is configured to perform functionalities in accordance with computer-readable instructions stored in the computer-based memory 1564.

The processor 1562 has a pair of power terminals, an SCL clock signal terminal, and an SDA data signal terminal. The power terminals on the processor 1562 are connected to a power bus, which is connected to: 1) an external power management subassembly (not shown in FIG. 15), which may include, for example, a battery in a battery storage compartment and a charging circuit for the battery, and 2) an external optical identifier system (also not shown in FIG. 15). The SCL clock signal terminal and the SDA data signal terminal on the processor 1562 are connected to a clock and data bus, which, in the illustrated implementation, is connected to: 1) the external optical identifier system, and 2) a Neurbot (NB) framework. The connection to the NB framework may include a wireless transceiver or a wired connection and the NB framework may include one or more external processors and/or memory storage devices that can perform additional or more sophisticated data processing than the processor 1562 might be configured to perform.

FIG. 16 is a schematic representation of another exemplary NB controller 1660.

The illustrated NB controller 1660 has a computer-based processor 1662 and a computer-based memory 1664. The processor 1662 has a pair of power terminals, an SCL clock signal terminal, and an SDA data signal terminal, as in the processor 1560 of FIG. 15. However, the processor 1662 also has other terminals, including a transmit (Tx) terminal, a receive (Rx) terminal, and three signal terminals (Sig). These additional terminals provide connection points for additional environmental sensors, for example, such as motion sensors, thermopiles, etc., which may, in some instances, provide additional information about the environment into the processor 1662. The NB controller 1660 in FIG. 16 is connected to other external components (e.g., an optical identification system, a power management subassembly, and an NB framework) in the same way as the NB controller 1560 in FIG. 15.

In various implementations, a Raspberry PI-3 system on a board (SOB) for example, can provide various i2c bus communications, serial bus communications, Bluetooth communications, and WiFi communications, if utilized as the processor 1562, 1662 in a NB controller 1560, 1660.

FIG. 17 is a schematic representation of an exemplary configuration that includes NB controller 1660 connected to a power management subassembly 1766, a user affirmation device 1768, and a wireless communication device 1770.

The power management subassembly 1766 in the illustrated implementation includes a holder for a portable battery 1772 and a Qi charging receiver 1774. Qi is an open interface standard that defines wireless power transfer based on inductive charging over short distances. The system typically uses a charging pad and a compatible device (here, the power management subassembly), which can be placed on top of the pad and have its battery 1772 charged via resonant inductive coupling from the pad through the Qi charging receiver 1774. Terminals from the battery compartment for the portable battery 1772 are connected, via electrical conductors, to provide electrical power to the NB controller 1660, to the user affirmation device 1768, and to the wireless communications device 1770

The user affirmation device 1768 generally includes some input device (e.g., a switch, button, microphone, etc.) that a user can manipulate or interact with to indicate to the system an affirmation that some proposed action by the system is desired by the user and should be performed by the system. Thus, in one example, a user can interact with the user affirmation device 1768 (e.g., by pressing a button or the like) to essentially authorize or unlock one or more system functionalities.

In the illustrated implementation, the user affirmation device 1768 has a pair of power terminals (+, −), a clock terminal SCL, and a data terminal SD. The power terminals on the user affirmation device 1768 and connected to the corresponding power terminals of the power management subassembly 1766 via electrical conductors.

The wireless communications device 1770 is a device that essentially enables the NB controller 1660 to wirelessly communicate with one or more external devices or components. The wireless communications device 1770 in the illustrated example is an infrared wireless communications device that includes an IrDA board and an optical infrared (IR) transceiver on the IrDA board. The IrDA board has a pair of power terminals (+, −), a transmit (Tx) terminal, a receive (Rx) terminal, a mode (MODE) terminal, a reset (RST) terminal, and an enable (EN) terminal.

The power terminals (+, −) on the IrDA board are connected to corresponding power terminals on the power management subassembly 1766 via electrical conductors. The receive (Rx) terminal on the IrDA board is connected to the transmit (Tx) terminal on the NB-C processor via an electrical connector. The transmit (Tx) terminal on the IrDA board is connected to the receive (Rx) terminal on the NB-C processor via an electrical conductor. The mode (MODE), reset (Rst) and enable (En) terminals on the IrDA board are connected to respective signal (Sig) terminals on the NB-C processor.

During operation, the wireless communication device 1770 can transmit data from its transmit (Tx) terminal to the receive (Rx) terminal on the NB-C processor, the NB-C processor can transmit data from its transmit (Tx) terminal to the receive (Rx) terminal on the wireless communication device 1770. The NB-C processor can send one or more signals to the mode (MODE) terminal on the wireless communication device 1770 to set an operating mode of the wireless communication device 1770, to the reset (Rst) terminal on the wireless communication device 1770 to reset the device, and/or to the enable (En) terminal on the wireless communication device 1770 to enable one or more functionalities in the wireless communication device.

IrDA refers generally to the Infrared Data Association, which provides specifications for a set of protocols for wireless infrared communications, and the name "IrDA" also refers to that set of protocols. One benefit of using IrDA is to achieve wireless data transfer over a short distance using point-and-shoot principles. IrDA provides wireless optical communication and data transfer that tends to be physically secure, utilizes line-of-sight (LOS) transfer, and tends to experience very low bit error rates (BER) that make it very efficient.

In some implementations, the wireless communications device may be or include a MIKROE-1195 IrDA2 click Board from the MikroElektronika™ company. This board features the MCP2120 infrared encoder/decoder placed between a Universal Asynchronous deceiver/Transmitter (UART) and an infrared (IR) optical transceiver. The modulation and demodulation method is generally performed in accordance with the IrDA standard. The IR optical transceiver may be a TFDU4101 transceiver, an infrared transceiver module compliant with the IrDA physical layer standard for fast infrared data communication. The board in some implementations may feature a surface mount device (SMD) jumper for selecting whether board will be operating on 3.3V or 5V power supply.

The configuration represented in FIG. 17, with the user affirmation device, may form at least part of a mobile personal NB.

FIG. 18 is a schematic representation of an exemplary configuration that includes NB controller 1860 connected to power management subassembly 1766, a user affirmation device 1868 (with a button 1869), and wireless communication device 1770 (with the optical infrared transceiver).

The NB-C processor 1861 in FIG. 18 is similar to the NB-C processor 1761 in FIG. 17, except that the NB-C processor 1861 in FIG. 18 has an extra signal (Sig) terminal. The button 1869 of the user affirmation device 1868 in the illustrated configuration is electrically connected between a power terminal of the power management subassembly 1766 and a signal terminal (Sig) on the NB-C processor. During operation, if a user presses the button, thereby connecting power to the signal (Sig) terminal, the system recognizes that the user has authorized some action. For this, the processor executes machine code to interact with the user affirmation device to obtain user affirmation. As mentioned below, the system interprets, which could be restated as machine code is performed to act upon an input to interpret the input as an affirmation that the system should perform some function (also machine code).

In some implementations, the user affirmation device 1868 may be only the button 1869.

Although a button 1869 is shown, virtually any kind of user input device (e.g., a switch, a knob, a microphone, a camera, etc.) could be used in its place to enable a user to provide an input into the system that the system will interpret as an affirmation that the system should perform some function.

FIG. 19 is a schematic representation of an exemplary configuration that includes NB controller 1960 connected to power management subassembly 1766, and a plurality of environmental sensors and other input/output devices, via a circuit board ("Home NeurBot circuit board") 1961. The illustrated circuit board includes a multi-channel analog-to-digital converter (A/D converter) and a thermistor (thermistor-2) connected to one of the channels of the A/D converter. An external thermistor (thermistor-1) and a photoresistor are connected to two other channels of the A/D converter.

Other sensors and input/output devices that are connected to the NB-C processor in the illustrated implementation include a wireless communication device (that includes, e.g., IrDA board, discussed above), a camera, a speaker, a microphone, three passive infrared sensors (PIR-1, PIR-2, PIR-3), a servo motor (that may control the orientation or position of an external device, such as a camera or the like), a keypad (3×4 matrix keypad), a global positioning system (GPS), an ultrasonic sensor, a monitor (e.g., a thin film transistor (TFT), liquid crystal display (LCD) color monitor), a pair of light emitting diode (LED) strips that may illuminate to indicate system action to a user for example, and an accelerometer. The particular sensors and/or I/O devices in various implementations can vary. Any one or more of the sensors and/or I/O devices, or other devices, may be connected to the NB-C processor in a manner that is similar to the manner represented in the illustrated implementation.

FIG. 20 is a schematic representation of part of a system where the processing functionalities associated with an exemplary optical identification system (OIS), an NB-C controller, and/or external communication devices (e.g., via a wireless communication device 2070 and/or camera 2072) are performed by a single, shared computer-based processor 2074. The illustrated processor 2074 has power terminals that are connected to the power management subassembly 2066.

The processor has other signal terminals that connect the processor to, and facilitate the processor's control/interactions with the wireless communication device 2070, components of an optical identifier system (include laser 2002, camera 2004, relay 2010, and computer-based memory 2008), and a separate camera 2072.

The system in FIG. 20 also includes an optical identifier 2052. In some implementations, the optical identifier 2052 is a fixed optical identifier (e.g., one that is held in place as shown between the laser 2002 and the camera 2004 and not easily removed without hand tools or without damaging the optical identifier or the structure(s) holding the optical identifier in place). In some implementations, the optical identifier 2052 is a removable optical identifier (e.g., one that can easily be temporarily positioned between the laser 2002 and the camera 2004 for reading and then removed by hand and generally without requiring any special hand tools or the like).

In some implementations, if the optical identifier 2052 is a fixed optical identifier, then the optical identifier 2052 may act, within whatever system it is installed, as a sort of subscriber identification module (SIM) card. In this regard, the fixed optical identifier may include data (e.g., as a code page in a volume hologram) that the system can use to identify and/or authenticate various things including, for example, the device within which the optical identifier is installed and/or the human user that owns or has a subscription to a service rendered through the device. In some instances, the fixed optical identifier may store contact information for those human users.

In implementations where the optical identifier 2052 is fixed, the system includes a holder (not shown in FIG. 20) that physically holds the optical identifier in place as shown between the laser 2002 and the camera 2004, thereby configuring and orienting the optical identifier 2052 so that the laser 2002 can emit light from its lens (lens-1) through to optical identifier 2052 to produce an image of the data contained in the volume hologram in the optical identifier 2052 at the lens (lens-2) of the camera (camera-1) 2004.

The separate camera (camera-2) 2072 in system in FIG. 20 also is connected directly to a data terminal on the computer-based processor 2074 by an electrical conductor. This camera (camera-2) 2072 is configured to capture images of data from a volume hologram in an optical identifier. In a typical implementation, the camera (camera-2) 2072 is configured to capture images of data from a reflective volume hologram in an optical identifier. In this regard, the camera (camera-2) 2072 may, in some implementations at least, include a flash to illuminate a reflective hologram when the image is to be taken. Once the image is captured by the camera (camera 2) 2072, the camera (camera 2) 2072 conveys corresponding image data to the computer-based processor 2074 for processing and/or storing in the computer-based memory 2008. In a typical implementation, the camera (camera-2) 2072 includes a button or some other activation device to cause it to operate when an optical identifier is placed in front of its lens (lens-3). The relay 2010, as shown, controls the laser 2002 in response to input from the processor 2074. In some implementations, the relay 2010 also controls one or more of the cameras.

The Power management subassembly 2066 in the illustrated implementation is connected to the IrDA board of wireless communication device 2070, the laser 2002, the relay 2010, and the processor 2074.

In an exemplary implementation, the IrDA board may be a MIKROE-82 from MikroElektronika™, which is comprised of a MCP2120 infrared encoder/decoder placed between a UART and an infrared (IR) optical transceiver. The IrDA board features the MCP2120 infrared encoder/decoder. The modulation and demodulation method is performed in accordance with the IrDA standard. The TFDU4101 diode is an infrared transceiver module compliant with the IrDA physical layer standard for fast infrared data communication.

Moreover, in an exemplary implementation, camera (camera-1) 2004 is a Raspberry Pi Cam connected to the camera port of a Raspberry Pi-3. Moreover, camera (camera-2) 2072 in an exemplary implementation can be connected to the processor 2074 using a communication bus, such as a universal serial bus (USB), or a multi camera adaptor. In some implementations, a multi camera adapter (MC Adapter) module for Raspberry Pi is connected to the Raspberry Pi 3 camera port, camera 1 is connected to the MC adapter, and camera 2 is connected to the MC adapter.

The laser 2002 is connected to the relay 2010 (that operates, e.g., as an on-off switch) which is connected to the processor 2074. During operation, the processor can execute functionalities in accordance with instructions stored in memory 2008 computer-readable instructions to turn on the laser 2002 (e.g., by sending a signal causing the relay 2010 to switch, e.g., off to on) and to turn off the laser (e.g., by sending a signal or merely discontinuing a signal to allow the relate to switch again, e.g., on to off). The laser is positioned to emit the laser light from Lens-1 onto optical identifier O.I. to generate an image of the code page encoded in the hologram of O.I., under pre-determined conditions, and further positioned to project the image onto lens-2 of camera-1. The processor performs functionalities in accordance with instructions stored in memory 2008 that action causes an aperture assembly of the camera to take a picture of the image as first piece of digital data, which may be stored, for example, in the memory 2008 of the processor 2074.

In some implementations, the processor 2074 may compute a second piece of digital data based on the first piece of digital data. In some implementations, the second piece of digital data may be an SHA-526 key. The SHA (Secure Hash Algorithm) is one of a number of cryptographic hash functions. A cryptographic hash may be considered a signature for a text or a data file. The SHA-256 algorithm generates a fixed size 256-bit (32-byte) hash. Hash is a one way function. It generally cannot be decrypted back. This makes it suitable for password validation, challenge hash authentication, anti-tamper, digital signatures, etc.

In some implementations, the first camera 2004 is inside a housing, (e.g., the housing 1450 of FIG. 14), and the second camera is mounted to the housing and configured to capture an image of an object (e.g., a volume hologram of a reflective optical identifier) outside the box.

FIG. 21 is a schematic representation of at least part of a system that includes a computer-based processor 2174 connected to a computer-based memory 2108. The processor 2174 is further connected, via signal lines, to a user affirmation device 2168, a relay 2110, a wireless communication device 2170, a camera 2105, and an NB-OIS (optical identification system) 2179. The system also includes a power management subassembly 2166, which is connected to the processor 2174 to supply it with power. The processor 2174 in the illustrated implementation is connected via power lines to the wireless communication device 2170, the relay 2110, and the laser 2102. Other power lines and/or power sources may be provided to supply power throughout the system.

In a typical implementation, the system in FIG. 21 would have a housing (not shown) that defines a slot 2154 for receiving an optical identifier 2152. More particularly, in the illustrated implementation, the slot 2154 is configured so that the optical identifier 2152 can be inserted, by a user, into the slot 2154 and that doing so would position and orient the optical identifier between the laser 2170 and the camera 2104 so that the laser 2170 can emit light into the optical identifier (from one side thereof) to produce an image at a lens of the camera 2104 (on the opposite side of the optical identifier).

Moreover, the processor 2174 in the illustrated implementation is connected to a cellular communication module 2176 (e.g., a GSM/GPRS module and a SIM card installed to enable the Mobile NB to communicate using a cellular phone network or the like). General Packet Radio Service (GPRS) refers to a packet oriented mobile data standard on the 2G and 3G cellular communication network's global system for mobile communications (GSM).

FIG. 22 is a schematic representation showing an implementation of an optical identifier registration system 2276 and a film 2278 that includes an array of optical identifiers OI1 . . . OIC moving through the optical registration system 2276. In a typical implementation, each optical identifier OI1 . . . OIC on the film 2278 of optical identifiers has purely random data stored therein (e.g., in the form of a code page) as a volume hologram in the optical identifier.

The optical identifier registration system 2276 is generally configured to read data from the optical identifiers on the film 2278, as the film 2278 moves through the optical identifier registration system 2276. In this regard, in the illustrated implementation, the film 2278 is supported in a substantially horizontal plane by a support frame 2280 and, for registration, is moved in the direction indicated by arrow "A" through the optical identifier registration system 2276.

The film 2278 may be made from an optical substrate material, such as glass or some other substantially rigid transparent or translucent material. There are sixteen discrete optical identifier areas (represented as boxes and labeled OI1 . . . OIC on the film 2278 in FIG. 22). These sixteen discrete optical identifier areas are arranged on the film 2278 in a 4×4 array. Each discrete optical identifier area on the illustrated film has a unique, very large, collection of purely random data stored therein as a code page, for example, in a volume hologram. Thus, the film 2278 shown in the figure, which has sixteen discrete optical identifier areas, has sixteen volume holograms, with each of the volume holograms storing a code page with a unique, very large, collection of purely random data stored therein.

In a typical implementation, the film 2278, after passing through the optical identifier registration system 2276 would be diced up to separate the discrete optical identifier areas from one another to form sixteen separate optical identifiers, each having a volume hologram storing a code page with a unique, very large, collection of purely random data stored therein.

The optical identifier registration system 2276 in the illustrated figure has four lasers 2202 and four cameras 2204. Each respective one of the lasers 2202 is configured to direct light toward a corresponding one of the cameras 2204. Thus, when one of the optical identifier areas OI1 . . . OIC on the film 2278 is positioned between one of the lasers and a corresponding one of the cameras, that laser can, and does, direct light in a substantially upward direction through the optical identifier area to produce an image of the data from the volume hologram in that optical identifier area at the corresponding camera 2204.

The lasers 2202 and the cameras 2204 are arranged in a plane that is perpendicular to the film's direction of motion (see arrow "A") through the optical identifier registration system 2276. At any given point in time during system operation, while the film 2278 is moving through the optical identifier registration system 2276, four optical identifier areas in a row (e.g., OI1, OI2, OI3, and OI4) on the film 2278 may be positioned between the lasers 2202 and the cameras 2204. At that point in time, in a typical implementation, the lasers 2202 begin producing their light beams and the cameras 2204 capture the resulting images.

The illustrated system includes a computer-based processor 2274 and a computer-based memory 2268. The computer-based processor 2274 is configured to interact with other system components and to perform functionalities according to computer-readable instructions stored in the computer-based memory 2268. The illustrated system 2276 also has four relays 2210, Each relay 2210 may close, for example, to cause a particular one of the lasers 2202 to begin producing its light beam. The relays 2210 are connected to, and controlled by, the processor 2274.

In a typical implementation, the processor 2274 closes all of the relays 2210 at the same time (e.g., in response to receiving a signal from a position sensor, motion sensor, timer, etc. in the system indicating that the film is an appropriate position for a row of optical identifier areas to be read). All of the lasers 2202 turn on in response to the relays 2210 closing. At that point, in a typical implementation, the processor 2274 causes all of the cameras 2204 to capture the image of the data in the associated volume hologram appearing at their lenses.

The cameras 2204 provide a digital representation of the images they capture to the processor 2274, which may process those images and/or store the associated image data in memory 2208.

Once the image data for a particular row of optical identifier areas on film 2278 has been captured, the processor causes or allows the relays to open, which results in the lasers turning off. The film 2278 of optical identifier areas is then advanced (by hand or automatically by a mechanical conveyor, in direction "A," to align the next row of optical identifier areas with the lasers 2202 and cameras 2204, and the process described above repeats.

Once the image data for a particular one of the optical identifier areas Oi1 . . . OIC has been captured and stored in the system, the system 2276, in a typical implementation, can use that stored data to later verify that the corresponding optical identifier is a valid one (i.e., one that has been registered with the system) when, for example, a user later enters the optical identifier into a system OIS to identify himself or herself. In a typical implementation, this digital data is recorded into memory, to represent a registered identifier, so that the assertion: "there is an optical identifier where identifier is equal to the registered identifier" is true. The manufacturing machine can communicate a communication declaring the assertion as true, to a server machine, for example. The illustrated system includes a wiring harness to harness the wiring and support for certain system components. The system also has an NB-OIS 2279 connected to the processor and to a power management subassembly 2266. The power management subassembly 2266 is further connected to the processor, the relays and may, of course, be connected to other system components to provide power thereto.

A number of embodiments of the invention(s) have been described. Nevertheless, it will be understood that various modifications may be made without departing from the spirit and scope of the invention.

For example, the disclosure herein explains that a laser can be used to direct light toward an optical identifier to illuminate the volume hologram thereupon. However, other illumination sources, such as light emitting diodes, etc. may be used for this purpose instead of lasers.

Additionally, the various system components can be arranged relative to each other in a wide variety of ways. Various different optical elements (e.g., lenses, mirrors, etc.) can be incorporated into the system in a variety of ways. The sizes and shapes of the various optical elements can vary as well. The laser(s) can be configured to produce any wavelength or wavelengths of light. Various numbers of lasers and various numbers of cameras can be used. The optical identifier, including its optical substrate and/or volume hologram, can vary considerably. For example, the size (length, width, thickness, etc.) of the optical substrate can vary. Likewise, the shape of the optical substrate can vary as well. The distribution and arrangement of data throughout or on the optical substrate can vary as well. The holding apparatus for the optical identifier can vary in size, shape and configuration. The computer-readable instructions referred to herein can take on any one or more of a variety of possible forms of computer-readable instructions.

A variety of specific physical configurations, such as circuit boards having solder points, micro USB connectors, mirrors, housings, holding apparatuses, etc. have been disclosed. The systems and techniques disclosed herein can be implemented however without necessarily incorporating any of the specific physical configurations disclosed herein. Moreover, some implementations might combine features from any of the specific physical configurations disclosed herein, and/or combine those any of those features with other features not specifically disclosed.

As another example, in certain implementations, the systems and techniques disclosed herein can be combined with any other systems or techniques not specifically disclosed herein.

Additionally, in various embodiments, at least some of the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer-based memory or computer storage medium can be, or can be included within, a computer-readable storage device, a computer-readable storage substrate, a random or serial access memory array or device, or a combination thereof. While a computer storage medium should not be considered to include a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

The operations described in this specification can be implemented as operations performed by a data processing apparatus (e.g., a processor) on data stored on one or more computer-readable storage devices or received from other sources. The terms "processor," and/or "computer-based processor" encompass all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a claimed combination can in some cases be excised from the combination, and the claimed combination may be directed to a subcombination or variation of a subcombination.

Similarly, while operations may be depicted in the drawings and/or described herein as occurring in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The phrases computer-based memory, computer-readable medium, computer-readable storage medium, or the like, is intended to include, for example, non-transitory mediums.

In certain respects, this disclosure relates to hardware components of a Thing Machine (from NeurSciences LLC), and in other respects, this disclosure relates to embodiments of models as computer-readable instructions that can be performed by a processor of the Thing Machine. An NB multidimensional graph controller includes a processor with a connected memory, a connected communication bus, a connected or connectable power source, and computer readable media. In some instances, the NB controller performs one or more functionalities in accordance with computer-readable instructions P(TM(i)) where P is a set of equations representative of the procedural steps of an algorithmic implementation of a modeled action given by the identifier i, and the set may be embodied as computer-readable instructions in non-transitory computer readable media that the NB controller's processor can load and perform. In certain instances, the NB controller can perform according to models where each model is comprised of a set of Things representative of a set of Things representative of P(TM(i)), and a set of Things that the performance of the P(TM(i)) can act upon.

In some instances, the system disclosed herein includes a User Affirmation Device. In some such instances, a user may interact with an electromagnetic waveform or electronic or mechanical or optical device coupled to a processor to perform a user affirmation action as a signal of the user's consent for the processor to perform a second action as a user consented action, and in response thereto the processor performs the user consented action.

In this regard, the processor may instruct a connected device, sensor, etc. to perform an action to alert a user that the user should perform a user affirmation action to give consent for the computer-readable instructions to perform a user consented action.

The user consented action, can be embodied in computer-readable instructions as a set of performable actions that can be configured and represented using a modeled vocabulary expressed as Things representative of performable actions and Things an action can act upon.

In certain instances, a Thing Machine runtime can perform P(TM(evaluate)) computer-readable instructions to evaluate a statement Thing in the context of the Things in the vocabulary to algorithmically compute a performable statement Thing, and, the P(TM(perform)) action can perform the performable statement Thing. The use of the vocabulary enables the action to compute a statement Thing that when performed can communicate a representation of a directive to the user to perform the user affirmation action. By way of example, but not limitation, the action can communicate prerecorded audio content in non-transitory memory to adapted or wireless speaker to instruct the user to "Press the button to consent."

The performance of the user affirmation action may result in storing, in memory, digital data representative of a response of the user affirmation action. By way of example, but not limitation, digital data in non-transitory memory representative of an iris scan, a fingerprint, an image, a video, a personal identification number, or an identifier such as a URI, or an IRI. The processor can interact with this digital data to locate in computer readable media, corresponding data to validate the digital data as TRUE or FALSE user consent. In response to a TRUE user consent determination, the processor performs, or causes to be performed, the user consented action. In response to a FALSE user consent, the processor does not perform or cause to be performed the user consented action.

In some instances, an NB-OIS circuit board may have upon it a processor connected to computer readable media and may be configured to load computer-readable instructions from the computer readable media (e.g., during the boot) and perform functionalities in accordance with that computer-readable instructions as actions to initialize and perform a runtime comprising the steps of:
1. interacting with communication bus to receive, in non-transitory memory, a representation of a request;
2. evaluating the request in the context of performable actions to compute, in non-transitory memory, a performable statement;
3. performing a performable action to perform the performable statement to compute, in non-transitory memory, a response;
4. interacting with the communication bus to send a representation of said response.

A first request may be a request for an NB-OIS unique identifier, and in response thereto the processor interacts with a representation of a code page in non-transitory memory, to algorithmically compute a unique identifier as a response.

A second request may be a request for an NB-OIS asymmetric private key, and in response thereto the processor interacts with a representation of a code page in non-transitory memory, to algorithmically compute a asymmetric private key as a response.

A third request may be a request for an NB-OIS asymmetric public key, and in response thereto the processor interacts with a representation of a code page in non-transitory memory, to algorithmically compute a asymmetric private key as a response.

A fourth request may be a request for a key for an identifier, and in response thereto the processor interacts with a representation of a code page in non-transitory memory to algorithmically compute a key and responds with a representation of the key.

A fifth request may be a request for a random key of a specified size, and in response thereto the processor computes a key and responds with a representation of the key.

A sixth request may be a certificate signing request and in response thereto the processor issues a certificate and responds with a representation of a the certificate.

A seventh request may be a request for the NB-OIS to validate a certificate and in response thereto the processor determines an answer in memory indicating if the certificate is valid or invalid and responds with a representation of the answer.

An eighth request may be a request for the NB-OIS to generate a digital signature of request content, and in response thereto, the action generates a digital signature in non-transitory memory and responds with a representation of the digital signature.

A ninth request may be a request for the NB-OIS to validate a digital signature of request content and in response thereto, the action determines an answer in memory indicating if the digital signature of request content is valid or invalid and responds with a representation of the answer.

The computer-readable instructions can be adapted to provide for additional processor actions, and/or cipher actions.

Field programmable gate array(s) can be used for the processor(s) in certain instances.

The code page(s) can be encoded to represent computer-readable instructions. In those instances, during the boot process, the firmware can enable the relay to enable the laser to illuminate the code page as a projected image onto the lens of the camera, and, enable the camera to take a picture of said image as image data in memory, and decode the image data as computer-readable instructions in executable memory of processor, and perform the computer-readable instructions.

In some instances, the volume hologram of an optical identifier O.I. in a holding apparatus may be interrogated using a first light (light emitted from a laser) to project a code page image on the lens of a camera. When interrogated using a second light (e.g., light emitted from a different laser), the light passes through the O.I. in the holding apparatus without projecting a code page image and interrogates an optical identifier (sensitive to said light) placed in an O.I. slot to project a code page image onto the lens of the camera.

An OIS can include a contact switch so that when an optical identifier is placed into an O.I. slot, the contact switch will signal the processor and in response thereto, the processor will perform the action of enabling the relay switch to enable laser to interrogate the optical identifier placed in the O.I. slot to project a code page image onto the camera lens.

In some instances, the optical identifier (O.I.) placed in the holding apparatus is sensitive to the light emitted by a laser and projects an image onto the optical identifier placed in an O.I. slot to project a combined image as a code page image onto the lens of a camera. This may enable a NB-OIS to be configured with a first optical identifier to interrogate (in holding apparatus), and a second optical identifier in the O.I. slot to interrogate as needed or desired.

A unit of digital data computed from the digital data in non-transitory memory, of a first code page of a first optical identifier, can be representative of a Thing in the domain of a discourse. The said Thing can be classified as a Thing related to the implementation of a model. By way of example, but not limitation, a model related to finance, commerce, security, engineering, manufacturing, transportation, banking, operations, or travel.

Pairing may refer to the process of declaring a relationship between a Thing representative of a unit of digital data computed from the digital data of a first code page of a first optical identifier and a Thing representative of a unit of digital data computed from the digital data of a first code page of a second optical identifier. The pairing process may compute a declarative statement declaring how the first thing (x) relates to the second thing (y), and, the declaration can use universal or existential quantification. By way of example, but not limitation, exemplary statements can include:
1) all x are y;
2) some x are y;
3) this x is a y;
4) there is an x such that there is a y;
5) there is an x such that there is not a y; and,
6) there is a Thing where name is equal to x such that, there is a Thing where name is equal to y.

In an embodiment, the unit of digital data can be used in a declaration about a Thing such as: there is a first Thing where name is equal to name-1 and value is equal to value-1, such that there is a second Thing where name is equal to name-2 and value is equal to value-2, wherein name-1, name-2, value-1, and value-2 are variables and their correspond values in non-transitory memory can be a unit of digital data.

Verb actions can declare the relationship, assert a relationship is true, unset the relationship, test the existence of a relationship, hypothesize relationships, and infer relationships.

An optical identifier can be the optical identifier of an NB-OIS. An optical identifier can be an optical identifier inserted through the optical identifier cutaway into an O.I. slot of a NB-OIS. An optical identifier can be an optical identifier interrogated by a laser adapted to the NB-C.

When the processor is adapted to enable communication over a network, the processor can communicate a communication representative of a request to validate a unit of digital data and in response thereto, receive a representation of a response. When the response represents a valid unit of data, then the processor can successfully complete the pairing process. When the response indicates an invalid unit of data, then the processor stops the pairing process.

The process of pairing may, in some instances, require a user affirmation action to signal the user consent for performing the consented (the pairing process) action. By way of example, but not limitation, the user affirmation action may be to insert an optical identifier into an O.I. slot to enable a contact switch to signal the processor to interrogate said optical identifier.

If the processor is adapted to communicate over a network, the processor can perform the steps of communicating a communication representative of a request to identify a unit of digital data. In response thereto, the processor may perform the steps of receiving a response, storing the response in memory, where the response is representative of a set of Things representative of the unit of digital data. This can include an identity, an issued certificate, and/or an asymmetric public key.

In some instances, a first NB Form Factor may pair with a second NB Form Factor to enable the two NB Form Factors to subsequently communicate. Upon successfully pairing two optical identifiers, the assertion "There is a unit of digital data computed from a first optical identifier such that, there is a unit of digital data computed from a second optical identifier" holds.

In one embodiment, a first NB Form Factor identifies itself to a second NB Form Factor, and the second NB Form Factor identifies itself to the first NB Form Factor.

In another embodiment, pairing enables the first NB Form Factor to request the second NB Form Factor to identify itself to the first NB Form Factor, and in response thereto, the first NB Form Factor can perform computer-readable instructions to authenticate the identity of the second NB Form Factor prior to computing and providing a response.

In another embodiment, pairing enables the first NB Form Factor and the second NB Form Factor to exchange digital data from non-transitory memory representative of digital data required for subsequent communication. By way of example but not limitation digital data representative of a security credential such as an issued PKI certificate.

In some instances, a processor can perform the actions of:
1. sending a communication request to the IrDA board processor to be transmitted; and in response thereto,
2. receiving a communication response from the IrDA board processor, into non-transitory memory.

The request can include a representation of a unit of digital data. The response can include a representation of a unit of digital data. By way of example but not limitation the unit of digital data can be representative of an X.509 certificate; a public key; biometric data; a UIR; an IRI; a security token; or content of a security model enabling identity, authentication, and authorization. The security model embodiment can include the use of a password, passphrase, grant of right, a cipher key, or third party authentication methods.

A unit of digital data can be representative of a second communication method. By way of example, but not limitation, the response may include information to use in establishing a WiFi connection to the responding NB Controller, or Bluetooth pairing code, or a USB enablement code, or a key to use with a cipher service action.

The computer-readable instructions executing in the NB-Controller processor may enable the processor to receive the response as a unit of digital data, and algorithmically interact with the unit of digital data to enable the subsequent communications between the first NB-Controller and the second NB-Controller.

In some instances, a mobile personal NB of an NB-Controller may include or be connected to:
1. An NB-OIS;
2. an wireless communication device, such as an IrDA board with optical infrared transceiver;
3. a user affirmation device adapted to the NB-Controller; and/or
4. a power management subassembly comprised of a portable battery adapted to a QI charging transceiver.

In some instances, a system on board such as a Raspberry Pi 3 can be used for the processor and appropriate general purpose I/O (GPIO) pins to connect to mode, reset, and enable pins on an IrDA board. Additional pins can be used for the transfer and receive operations of a communication bus. The user affirmation device can be a 3×4 matrix keypad. The user may interact with the user affirmation device to signal user consent for an NB-C processor to perform one or more functionalities in accordance with computer-readable instructions.

In certain instances, a mobile personal NB is comprised of an NB-Controller connected to or including:
1. An NB-OIS;
2. an wireless communication device, such as an IrDA board with optical infrared transceiver;
3. a user affirmation device adapted to the NB-Controller wherein said device includes a relay switch and a button for a user operator to depress to complete a circuit to the relay switch to enable the IrDA communication; and,
4. a power management subassembly comprised of a portable battery adapted to a QI charging transceiver.

In some instances, a system on board such as a Raspberry Pi 3 can be used for the processor and appropriate general purpose I/O (GPIO) pins to connect to mode, rest, and enable pins on the IrDA board. The user affirmation device is illustrated comprised of a push button. The user interacts with the user affirmation device to signal user consent for the NB-C processor to perform a user consented action.

In some instances, in response to a user affirmative action, the processor performs, or causes to be performed, the steps of actuating a contact switch to enable the processor to enable the relay switch to enable the laser to interrogate an optical identifier.

In some instances, in response to a user affirmative action, the system performs the steps of handshaking with a second NB Form Factor.

In some instances, a Home NB Form Factor may include a NB-C processor connected to a power management subassembly, an adapted Home NB circuit board, and an NB-OIS.

In some instances, a first NB Form Factor communicates using a first communication bus to handshake with a second NB Form Factor to enable subsequent communications between the NB Form Factors. In most instances herein, the phrase NB Form Factor should be understood as referring to one particular NB.

In some instances, a first NB Controller processor with a first connected communication bus performs functionalities according to computer-readable instructions to provide the actions of:
1) communicating a representation of an algorithmically computed request in a first non-transitory memory, as a communication intended for a second NB Controller;
2) using the communication bus to receive a representation of a response communication in a second memory; and,
3) algorithmically interacting with the second memory to configure a third memory as a unit of digital data to algorithmically be acted upon by action in communicating a subsequent communication intended for the second NB Controller.

In some instances, the request communication includes a representation of a NB-OIS unit of digital data in memory, communicated to the NB-C processor of the first NB Controller, as a unit of digital data in memory.

In some instances, the request includes a representation of an NB-C processor algorithmically computed unit of digital data in non-transitory memory.

In some instances, an NB Controller NB-C may be adapted to communicate with NB-OIS. The NB-C processor, executing computer-readable instructions, may communicate a request to an NB-OIS processor for an algorithmically computed identifier, and in response thereto, receive in memory a representation of the identifier as a unit of digital data.

An NB-C processor can be further adapted to perform the action of interacting with computer readable media and the unit of digital data, to algorithmically compute a second unit of digital data in memory. By way of example, but not limitation, the first unit of digital data may be representative of a cipher key and computer readable media content is loaded into non-transitory memory as loaded digital data and algorithmically decrypted as a unit of digital data by performance of a cipher algorithm embodied as computer-readable instructions that acts upon the loaded digital data and cipher key.

The computer-readable instructions of a NB Controller connected to a NB-C camera connected to a relay switch connected to an NB-C laser, can, in some instances, provide the actions of:
1. enabling Relay switch to enable NB-C laser to illuminate an optical identifier O.I. embodied as a reflective hologram and positioned to reflect the resulting image on the lens of NB-C camera;
2. enabling NB-C camera aperture apparatus to take a picture of the resulting image as digital data in non-transitory memory; and 3. algorithmically interacting with said digital data to compute a NB-C processor algorithmically computed unit of digital data in non-transitory memory.

A user of a mobile NB form factor may position the infrared optical transceiver in line of sight of a NB Home Form Factor infrared optical transceiver and depress a push button on the mobile NB Form Factor to signal user consent for pairing the mobile NB Form Factor to the NB Home Form Factor. Similarly, the user may depress a push button connected to the NB Home Form Factor to signal user consent for pairing the NB Home Form Factor to the mobile NB Form Factor. In response thereto, the NB Form Factor processor and the NB Home Form Factor processor may pair the mobile NB Form Factor to the NB Home Form Factor.

In some instances, a system may use an alternative NB-OIS subassembly such as that of the reflective hologram, or that with a housing to allow the optical identifier to be interrogated, and then removed from the slot when and if applicable.

The P(TM(thing)) computer-readable instructions, in some instances, provide actions for administering Things in memory including a first Thing representative of a multidimensional graph of Things wherein a Thing with a representation of a reference to a performable action P(TM(i)) can be performed by a P(TM(perform)) action that causes the performance of the performable action of said Thing and wherein, the performance of the performable action can interact with a P(TM(thing)) action to act upon a set of Things which may include the Thing representative of the graph.

4. P(TM(receive)) where P is the procedural set of equations embodied as computer-readable instructions representative of the steps required to interact with a communication bus to receive digital data content and to set a Thing to be representative of the content;
5. P(TM(parse)) where P is the procedural set of equations embodied as computer-readable instructions representative of the steps required to parse content according to a language grammar as a Thing representative of a statement;
6. P(TM(evaluate)) where P is the procedural set of equations embodied as computer-readable instructions representative of the steps required to evaluate a statement in the context of the performable actions to compute and set a Thing representative of a perforable statement;
7. P(TM(perform)) where P is the procedural set of equations embodied as computer-readable instructions representative of the steps required to perform a performable statement wherein the performance thereof can set a Thing representative of a response;
8. P(TM(format)) where P is the procedural set of equations embodied as computer-readable instructions representative of the steps required to interact with the response Thing to format the response content according to the rules of a language grammar; and
9. P(TM(send)) where P is the procedural set of equations embodied as computer-readable instructions representative of the steps required to interact with the response Thing to format the response content according to the rules of a language grammar;

P(TM(configure)) computer-readable instructions may provide the algorithmic steps required in performing an implementation of a model identified as configure. In the model, configure can interact with P(TM(thing)) to configure the multidimensional graph of Things. This allows the state of the graph to change during the execution time including the Things that are representative of performable action, and the set of Things that an action can act upon.

In some instances, the NB-OIS is secured in a housing/enclosure to ensure the integrity of the NB-OIS. The enclosure may help prevent dust and debris from interfering with the interrogation of the optical identifier while enabling the NB-OIS to be connected to other components such as an NB-Controller board. A NB-Controller (NB-C) may be connected to an NB-OIS, a power management subassembly and to one or electromagnetic waveform devices/sensors as a NB Form Factor (NB-FF).

During the optical identifier manufacturing process, actions of a NB Manufacturing Machine, in certain instances, perform the following sequenced steps to enable the identifier of each optical identifier to be recorded as a registered optical identifier:

1. interacting with a set of electromagnetic waveform devices to record, in memory, a representation of pure random data;
2. algorithmically computing a representation of the pure random data as an identifier that gets stored in memory;
3. performing the conditional statement: if identifier is already registered, then performing the said sequenced steps starting with step 1; and
4. registering the identifier in non-transitory computer readable media as a registered identifier.

A registered optical identifier can be representative of an entity or thing. This enables processor(s) to algorithmically generate, evaluate, and perform declarative statements to declare things about optical identifiers, using the registered identifier value. By way of example, but not limitation the action can perform the algorithmic steps required to declare that "There is an A where identifier is equal to the registered identifier".

Actions can algorithmically generate assertions to test declared things, such as: "There is an A where identifier is equal to the registered identifier" which, as an assertion, is algorithmically evaluated to compute a true of false response.

This enables the processor(s), executing computer-readable instructions, to perform conditional statements such as: If there is an A where identifier is equal to the registered identifier, then jump to step 1, otherwise, declare that there is an A where identifier is equal to the registered identifier is true. The "declare" portion of the computer-readable instructions can interact with non-transitory computer readable media to record the declaration in said media.

In some instances, a processor, executing computer-readable instructions, performs the following steps to pair a first registered identifier with a second registered identifier:

1. algorithmically computing using digital data generated from a code page of a first optical identifier, in non-transitory memory, a first computed unit of digital data in non-transitory memory;
2. algorithmically computing using digital data generated from a code page of a second optical identifier, in non-transitory memory, a second computed unit of digital data in non-transitory memory; and,
3. algorithmically pairing the first unit of digital data and the second unit of digital data.

In some instances, an optical identifier is a NB-OIS optical identifier. In some instances, an optical identifier is an optical identifier inserted into an O.I. slot to enable the processor to perform computer-readable instructions to interrogate the volume hologram of said optical identifier. In some instances, an optical identifier is a reflective hologram positioned to enable a laser light to illuminate the embedded code page as an image projected onto the lens of a digital camera adapted to a processor with computer-readable instructions enabling the digital camera to generate a digital representation of the image in memory (i.e., to take a digital picture and store the image in non-transitory memory) as a unit of digital data.

In some instances, the unit of digital data is representative of an identifier. By way of example, but not limitation, the identifier can be further characterized as a URI, an IRI, a Thing listing, or a data record key. In some instances, the unit of digital data is representative of a set of non-mutable components of a Thing.

Relationships can be expressed as "There is an A where identifier is equal to a first registered identifier, such that, there is a B where identifier is equal to a second registered identifier." Relationships can be declared, and can also be tested through assertions. A declaration can also instruct the computer-readable instructions to remove a relationship. For example, "Declare that there is an A where identifier is equal to a first registered identifier, such that, there is not a B where identifier is equal to a second registered identifier."

Thus, an entity can register as a manufacturer, supplier, distributor, owner, licensor, licensee, renter, member, subscriber, or other such entity, and a declarative statement evaluated to declare an association between the entity and the optical identifier. Similarly, computer-readable instructions can be performed by a processor to declare an association between a device and an optical identifier. Thus, optical identifiers can be associated with people, places, and things, and the relationships between them administered using one or more optical identifier's identifier.

An NB Form Factor Machine can be embodied as a Thing Machine (NB Form Factor Thing Machine) by including actions for administering, in memory, a Thing representative of a graph of Things; computer-readable instructions to self-configure a set of Things representative of a first vocabulary; and computer-readable instructions providing an algorithmic runtime. The computer-readable instructions of the P(TM) may self-direct the assembly a first vocabulary. Computer-readable instructions may be then performed to interact with the environment to direct the assembly of a second vocabulary.

In the performance of a verb action the processor can interact with a pull up resistor to pull up a signal, or pull down a signal. By way of example, but not limitation, a Raspberry PI 3 includes a set of GPIO pins. A pin is set high when it is outputting 3.3 v or reading in 3.3 v. Otherwise, the pin is set low. Verb actions can interact with a Thing representative of a pin, to enable the pin to be set high, or disable the Thing to set low.

This enables the use of verb actions for devices such as: I/O Expanders, LED Drivers, Data Converters, Serial EEPROMs, FM Transmitters, LED Dimmers, LCD Drivers, Memory, Clocks, Audio, Video, Accelerometers, Synthesizers, Multiplexers, Repeaters, Hubs, Switches, and other such i2C devices. Verb actions can interact with pullup resistors adapted to a pin of a second processor, such as a microprocessor. By way of example, but not limitation, a processor I/O pin adapted to the MODE pin of a MCP2120 processor. When the MODE pin is low, the MCP2120 is in command mode, when the MODE pin is high, the MCP2120 is in data mode.

Other implementations are within the scope of the claims.

What is claimed is:

1. A system comprising:
  a plurality of mobile optical identifiers, each mobile optical identifier comprising:
    an optical substrate; and
    a volume hologram in the optical substrate; and
  a reader for the optical identifiers, the reader comprising:
    a housing;
    at least one illumination device in the housing;
    a camera in the housing; and
    a fixed optical identifier between the at least one illumination device and the camera in the housing, wherein the fixed optical identifier comprises an optical substrate and a volume hologram in the optical substrate,
    wherein the housing defines a slot for receiving one of the plurality of mobile optical identifiers;
    wherein the at least one illumination device is configured to direct light into at least one of the fixed optical identifier and the mobile optical identifier in the slot of the housing to produce an image of corresponding to at least one volume hologram of the mobile or fixed optical identifier at the camera, and
    wherein the camera is configured to capture the image, wherein the captured image is stored in a digital format by the system.

2. The system of claim 1, wherein the at least one illumination device comprises:
  a first illumination device; and
  a second illumination device,
  wherein the first illumination device is configured to direct light to pass through both the fixed optical identifier and the mobile optical identifier in the slot of the housing such that the image produced at the camera from the light that passes through both the fixed optical identifier and the mobile optical identifier includes data from the volume hologram of the mobile optical identifier and the volume hologram of the fixed optical identifier.

3. The system of claim 2, wherein the second illumination device is configured to direct light to pass through only one, not both, of the fixed optical identifier and the mobile optical identifier in the slot of the housing.

4. The system of claim 3, such that the image produced at the camera from the light of the second illumination device that passes through only one, but not both, of the fixed optical identifier and the mobile optical identifier includes data from either, but not both, of the volume hologram of the mobile optical identifier or the volume hologram of the fixed optical identifier.

5. The system of claim 4, further comprising:
  a computer-based processor; and
  a first relay switch coupled to the computer-based processor and to the first illumination device; and
  a second relay switch coupled to the computer-based processor and to the second illumination device,
  wherein the computer-based processor is configured to control the first relay switch to provide electrical power to the first illumination device to thereby turn on the first illumination device, and
  wherein the computer-based processor is configured to control the second relay switch to provide electrical power to the second illumination device to thereby turn on the second illumination device.

6. The computer-based system of claim 5, wherein the computer-based processor causes the first relay switch to provide electrical power to the first illumination device at the same time as the second relay switch provides electrical power to the second illumination device.

7. The computer-based system of claim 5, further comprising:

a user affirmation device coupled to the computer-based processor, wherein the user affirmation device is configured such that a user can manipulate or interact with the user affirmation device to indicate to the computer-based system that some proposed action by the computer-based system is desired by the user and should be performed by the computer-based system.

8. The computer-based system of claim 5, further comprising:

a wireless communication device coupled to the computer-based processor.

9. The computer-based system of claim 5, further comprising:

a plurality of environmental sensors coupled to the computer-based processor.

* * * * *